(12) United States Patent
Miao et al.

(10) Patent No.: US 11,240,432 B2
(45) Date of Patent: Feb. 1, 2022

(54) CONTROL METHOD FOR DISPLAYING IMAGES UPRIGHT

(71) Applicant: SZ DJI TECHNOLOGY CO., LTD., Shenzhen (CN)

(72) Inventors: Baojie Miao, Shenzhen (CN); Bingzhen Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 77 days.

(21) Appl. No.: 16/365,555

(22) Filed: Mar. 26, 2019

(65) Prior Publication Data

US 2019/0222757 A1 Jul. 18, 2019

Related U.S. Application Data

(63) Continuation of application No. PCT/CN2016/100367, filed on Sep. 27, 2016.

(51) Int. Cl.
*H04N 5/232* (2006.01)
*G09G 3/20* (2006.01)
(Continued)

(52) U.S. Cl.
CPC ....... *H04N 5/23245* (2013.01); *G06F 3/0482* (2013.01); *G06F 3/04845* (2013.01);
(Continued)

(58) Field of Classification Search
CPC ........... H04N 5/23245; H04N 5/23216; H04N 5/23293; G06F 3/04845; G06F 3/0482;
(Continued)

(56) References Cited

U.S. PATENT DOCUMENTS 9,516,214 B2 * 12/2016 Fujiwara ............... H04N 5/2621
2009/0273699 A1 * 11/2009 Lin ........................ H04N 5/772
348/333.11
(Continued)

FOREIGN PATENT DOCUMENTS

CN 1777226 A 5/2006
CN 1798245 A 7/2006
(Continued)

OTHER PUBLICATIONS

World Intellectual Property Organization (WIPO) International Search Report for PCT/CN2016/100367 dated May 31, 2017 8 Pages.

*Primary Examiner* — Twyler L Haskins
*Assistant Examiner* — Angel L Garces-Rivera
(74) *Attorney, Agent, or Firm* — Anova Law Group, PLLC

(57) ABSTRACT

A control method includes sending a switching signal to a camera to control the camera to switch between a landscape shot-mode and a portrait shot-mode, receiving an image from the camera, determining whether a display screen is in a landscape orientation or in a portrait orientation, and controlling the display screen to display the image upright. The image includes a landscape image captured by the camera in the landscape shot-mode or a portrait image captured by the camera in the portrait shot-mode. Controlling the display screen to display the image upright includes controlling the display screen to display the portrait image upright when the display screen is in the landscape orientation or controlling the display screen to display the landscape image upright when the display screen is in the portrait orientation.

18 Claims, 31 Drawing Sheets

(51) Int. Cl.
*G06F 3/0482* (2013.01)
*G06F 3/0488* (2013.01)
*G06F 3/0484* (2013.01)

(52) U.S. Cl.
CPC .......... *G06F 3/04883* (2013.01); *G09G 3/20* (2013.01); *G09G 2340/0414* (2013.01); *G09G 2340/0421* (2013.01); *G09G 2340/0492* (2013.01)

(58) Field of Classification Search
CPC ......... G06F 3/04883; G06F 2200/1637; G06F 3/0488; G09G 3/20; G09G 2340/0421; G09G 2340/0492; G09G 2340/0414
See application file for complete search history.

(56) References Cited

U.S. PATENT DOCUMENTS

| | | | | |
|---|---|---|---|---|
| 2011/0128410 A1* | 6/2011 | Lee | ........................ | H04N 5/772 348/231.99 |
| 2017/0192422 A1* | 7/2017 | Kim | ................... | H04N 5/2257 |
| 2019/0019476 A1* | 1/2019 | Ge | ........................ | G06F 1/1626 |

FOREIGN PATENT DOCUMENTS

| | | | |
|---|---|---|---|
| CN | 1835524 | A | 9/2006 |
| CN | 101729623 | A | 6/2010 |
| CN | 104125327 | A | 10/2014 |
| CN | 104363386 | A | 2/2015 |
| CN | 105120011 | A | 12/2015 |
| CN | 105554480 | A | 5/2016 |
| CN | 105959625 | A | 9/2016 |
| JP | 2006148302 | A | 6/2006 |

\* cited by examiner

CONTROL METHOD FOR DISPLAYING IMAGES UPRIGHT

CROSS-REFERENCE TO RELATED APPLICATION

This application is a continuation application of International Application No. PCT/CN2016/100367, filed on Sep. 27, 2016, the entire contents of which are incorporated herein by reference.

TECHNICAL FIELD

The present disclosure relates to consumer electronics technology and, more particularly, to a control method and apparatus, and an electronic apparatus.

BACKGROUND

With the development of science and technology, electronic devices, such as smartphones, tablet computers, or the like, have become widely used, for example, in remote monitoring or control of aircraft, or the like. A gimbal of an aircraft carrying a camera can rotate the camera for 90 degrees about the optical axis of the camera to switch between landscape (horizontal) and portrait (vertical) shot-modes. If the camera is switched from the landscape shot-mode to the portrait shot-mode, a photo obtained by the camera in the portrait shot-mode is displayed sideways on an electronic device that is remotely monitoring or controlling the aircraft. Similarly, if the camera is switched from the portrait shot-mode to the landscape shot-mode, a photo obtained by the camera in the landscape shot-mode is displayed sideways on the electronic device that is remotely monitoring or controlling the aircraft. No matter which one of the two switching modes described above is implemented by the gimbal, it is inconvenient for a user to conduct photo composition. Thus, the user experience is poor.

SUMMARY

In accordance with the disclosure, there is provided a control method including sending a switching signal to a camera to control the camera to switch between a landscape shot-mode and a portrait shot-mode, receiving an image from the camera, determining whether a display screen is in a landscape orientation or in a portrait orientation, and controlling the display screen to display the image upright. The image includes a landscape image captured by the camera in the landscape shot-mode or a portrait image captured by the camera in the portrait shot-mode. Controlling the display screen to display the image upright includes controlling the display screen to display the portrait image upright when the display screen is in the landscape orientation or controlling the display screen to display the landscape image upright when the display screen is in the portrait orientation.

Also in accordance with the disclosure, there is provided a control system including a memory storing computer executable instructions and a processor coupled to the memory. The processor is configured to execute the instructions to send a switching signal to a camera to control the camera to switch between a landscape shot-mode and a portrait shot-mode, receive an image from the camera, determine whether a display screen is in a landscape orientation or in a portrait orientation, and control the display screen to display the image upright. The image includes a landscape image captured by the camera in the landscape shot-mode or a portrait image captured by the camera in the portrait shot-mode. Controlling the display screen to display the image upright includes controlling the display screen to display the portrait image upright when the display screen is in the landscape orientation or controlling the display screen to display the landscape image upright when the display screen is in the portrait orientation.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

The terms "first," "second," or the like in the specification, claims, and the drawings of the disclosure are merely illustrative, e.g. distinguishing similar elements, defining technical features, or the like, and are not intended to indicate or imply the importance of the corresponding elements or the number of the technical features. Thus, features defined as "first" and "second" may explicitly or implicitly include one or more of the features. As used herein, "multiple" means two or more, unless there are other clear and specific limitations.

As used herein, the terms "mounted," "coupled," and "connected" should be interpreted broadly, unless there are other clear and specific limitations. For example, the connection between two assemblies may be a fixed connection, a detachable connection, or an integral connection. The connection may also be a mechanical connection, an electrical connection, or a mutual communication connection. Furthermore, the connection may be a direct connection or an indirect connection via an intermedium, an internal connection between the two assemblies or an interaction between the two assemblies.

Various exemplary embodiments corresponding to different implementations of the disclosure will be described. For simplification purposes, the elements and configurations for the specific embodiments are described below. It will be appreciated that the described embodiments are exemplary only and not intended to limit the scope of the disclosure. Moreover, the references of numbers or letters in various exemplary embodiments are merely for the purposes of clear and simplification, and do not indicate the relationship between the various exemplary embodiments and/or configurations. In addition, the use of other processes and/or materials will be apparent to those skilled in the art from consideration of the examples of various specific processes and materials disclosed herein.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Figure 1:
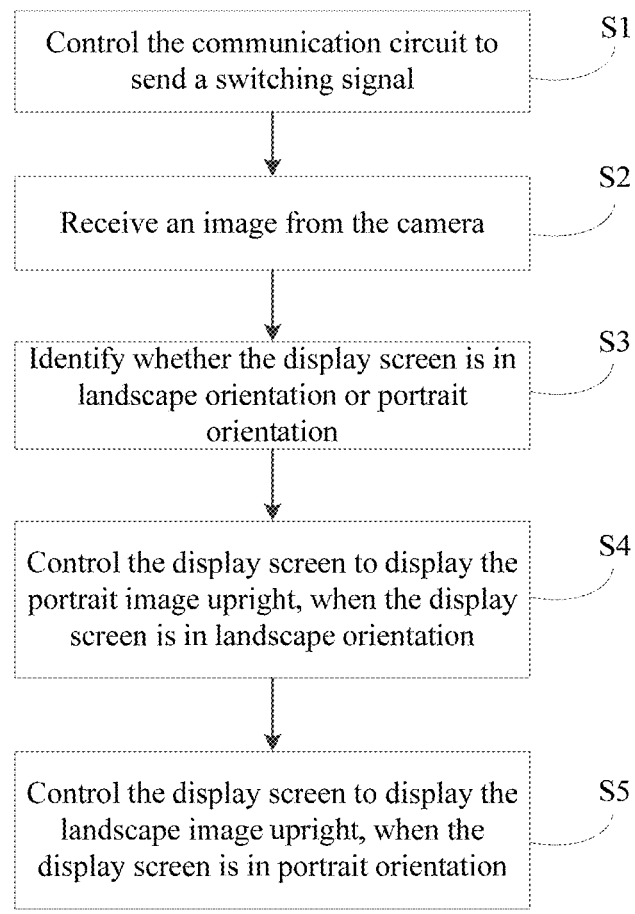
FIG. 1 is a schematic flow chart of a control method according to various exemplary embodiments of the disclosure.
Figure 3:
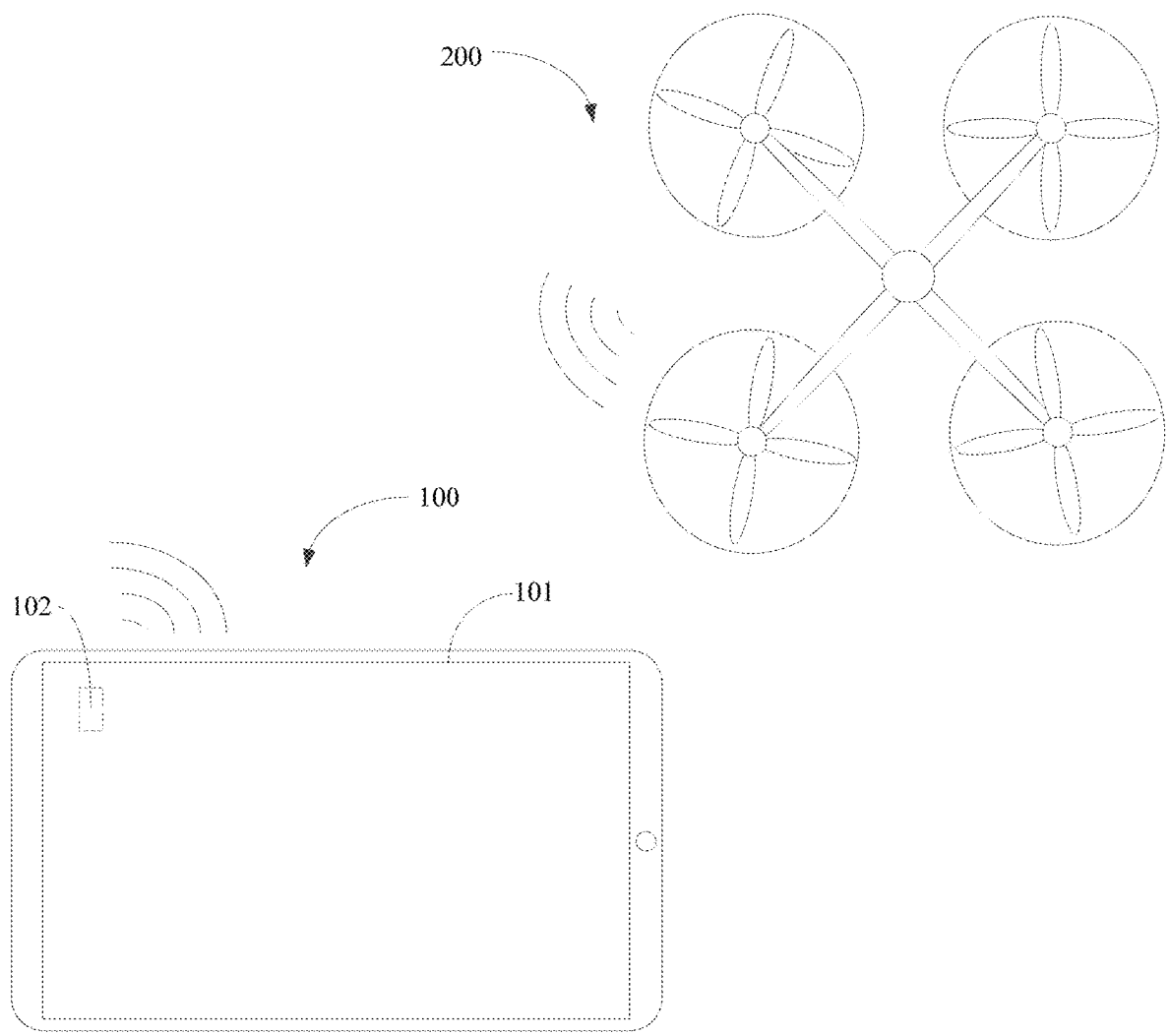
FIG. 3 is a physical schematic diagram of an electronic apparatus and an aircraft according to various exemplary embodiments of the disclosure.

FIG. 1 is a schematic flow chart of a control method consistent with the disclosure. The control method can be implemented to control an electronic apparatus 100 shown in FIG. 3, which includes a display screen 101 and a communication circuit 102. As shown in FIG. 3, the communication circuit 102 is configured to communicate with an aircraft 200. The aircraft 200 includes a camera (not shown).

As shown in FIG. 1, at S1, the communication circuit 102 is controlled to send a switching signal. The switching signal is configured to control the camera to rotate about an optical axis for switching between a landscape shot-mode and a portrait shot-mode.

At S2, an image from the camera is received. The image may be a landscape image obtained by the camera in the landscape shot-mode or a portrait image obtained by the camera in the portrait shot-mode.

At S3, whether the display screen 101 is in a landscape orientation or a portrait orientation is identified.

At S4, the display screen 101 is controlled to display the portrait image upright, when the display screen 101 is in the landscape orientation.

At S5, the display screen 101 is controlled to display the landscape image upright, when the display screen 101 is in the portrait orientation.

Figure 2:
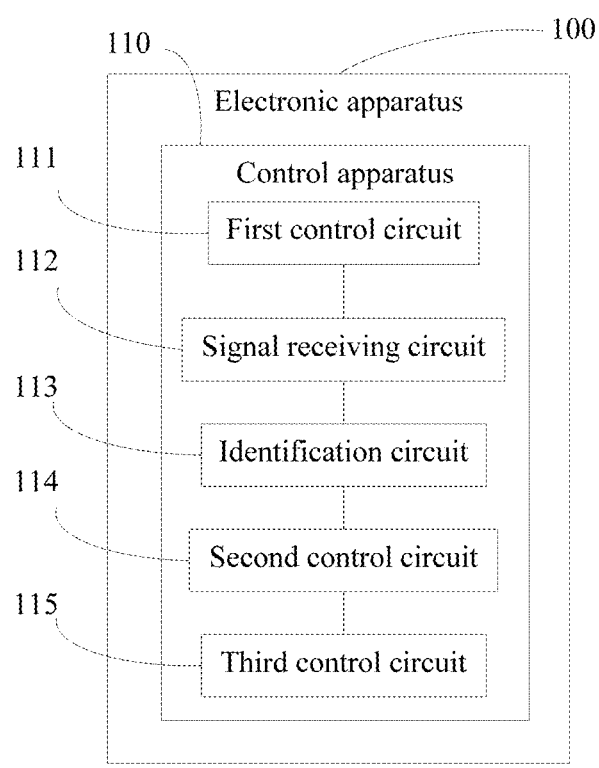
FIG. 2 is a schematic block diagram of an electronic apparatus and a control apparatus according to various exemplary embodiments of the disclosure.

FIG. 2 is a schematic block diagram of a control apparatus 110 consistent with the disclosure. As shown in FIG. 2, the control apparatus 110 includes a first control circuit 111, a signal receiving circuit 112, an identification circuit 113, a second control circuit 114, and a third control circuit 115, which are configured to implement the processes at S1, S2, S3, S4, and S5, respectively. Specifically, the first control circuit 111 is configured to control the communication circuit 102 to send the switching signal. The switching signal is configured to control the camera to rotate about the optical axis for switching between the landscape and portrait shot-modes. The signal receiving circuit 112 is configured to receive the image from the camera. The image may be the landscape image obtained by the camera in the landscape shot-mode or the portrait image obtained by the camera in the portrait shot-mode. The identification circuit 113 is configured to identify whether the display screen 101 is in the landscape orientation or in the portrait orientation. The second control circuit 114 is configured to control the display screen 101 to display the portrait image upright, when the display screen 101 is in the landscape orientation. The third control circuit 115 is configured to control the display screen 101 to display the landscape image upright, when the display screen 101 is in the portrait orientation.

The control apparatus 110 may be included in the electronic apparatus 100 consistent with the disclosure. The electronic apparatus 100 can be, for example, a tablet computer, as shown in FIG. 3. In some other embodiments, the electronic apparatus 100 may also include one or more of display terminals having a display function, such as a smartphone, a remote controller, a smartwatch, smart glasses, a smart helmet, another virtual reality wearable device, or another augmented reality wearable device. The display screen 101 is configured to display related information for monitoring or operating the aircraft 200, such as parameter information and flight information of the aircraft 200, and/or an image or video captured by the aircraft 200.

Figure 14:
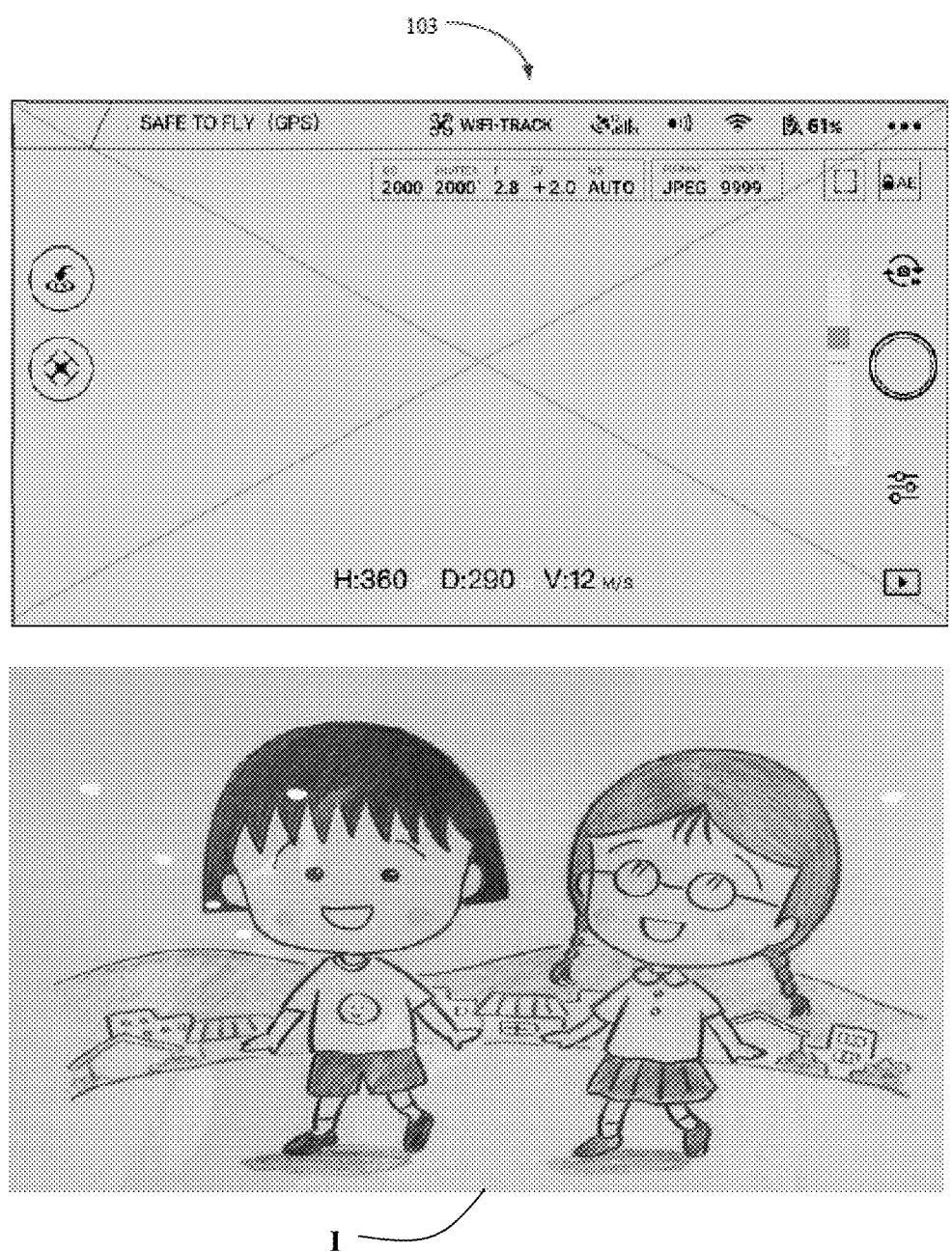
FIGS. 14-17 are schematic diagrams showing a screen in landscape orientation switching from displaying a landscape image to displaying a portrait image according to various exemplary embodiments of the disclosure.
Figure 15:
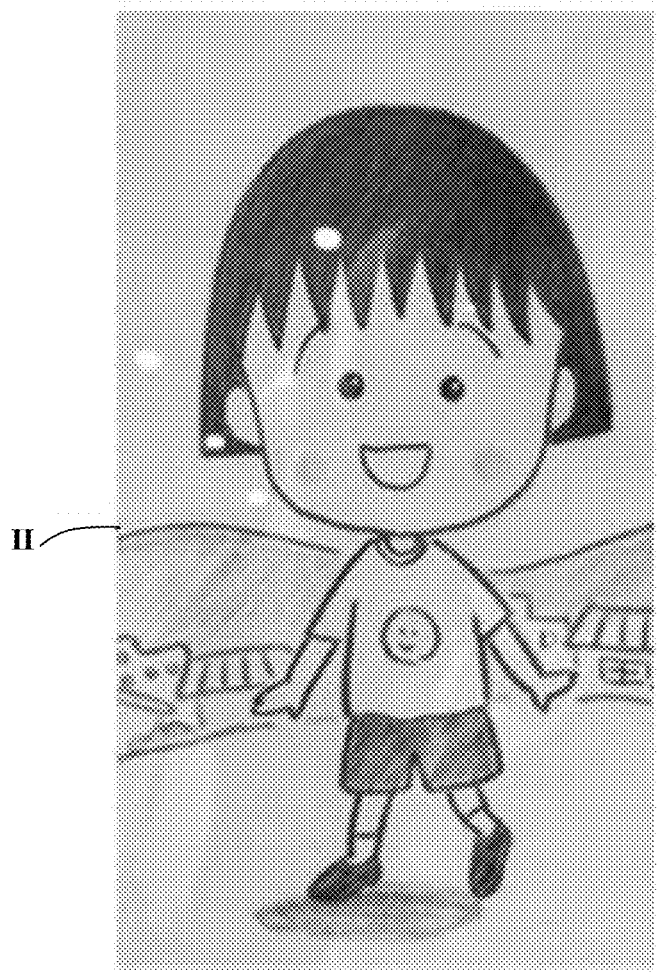
Figure 16:
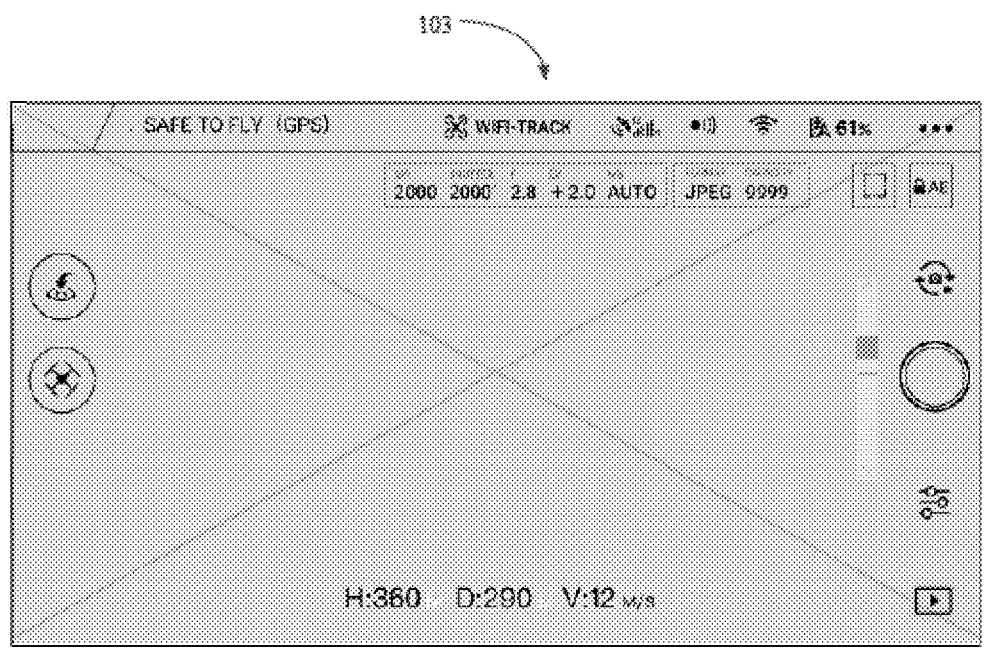
Figure 16:
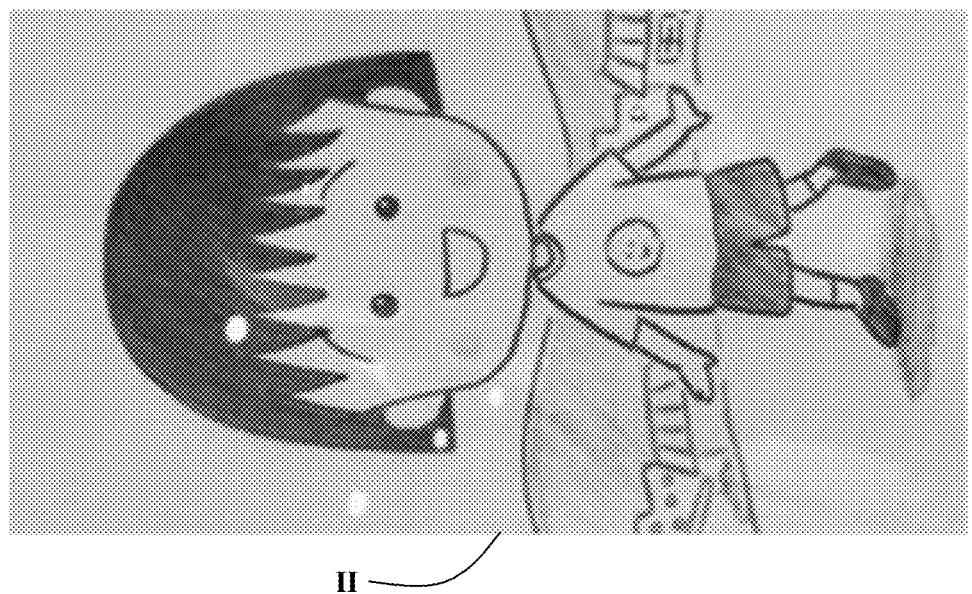
Figure 17:
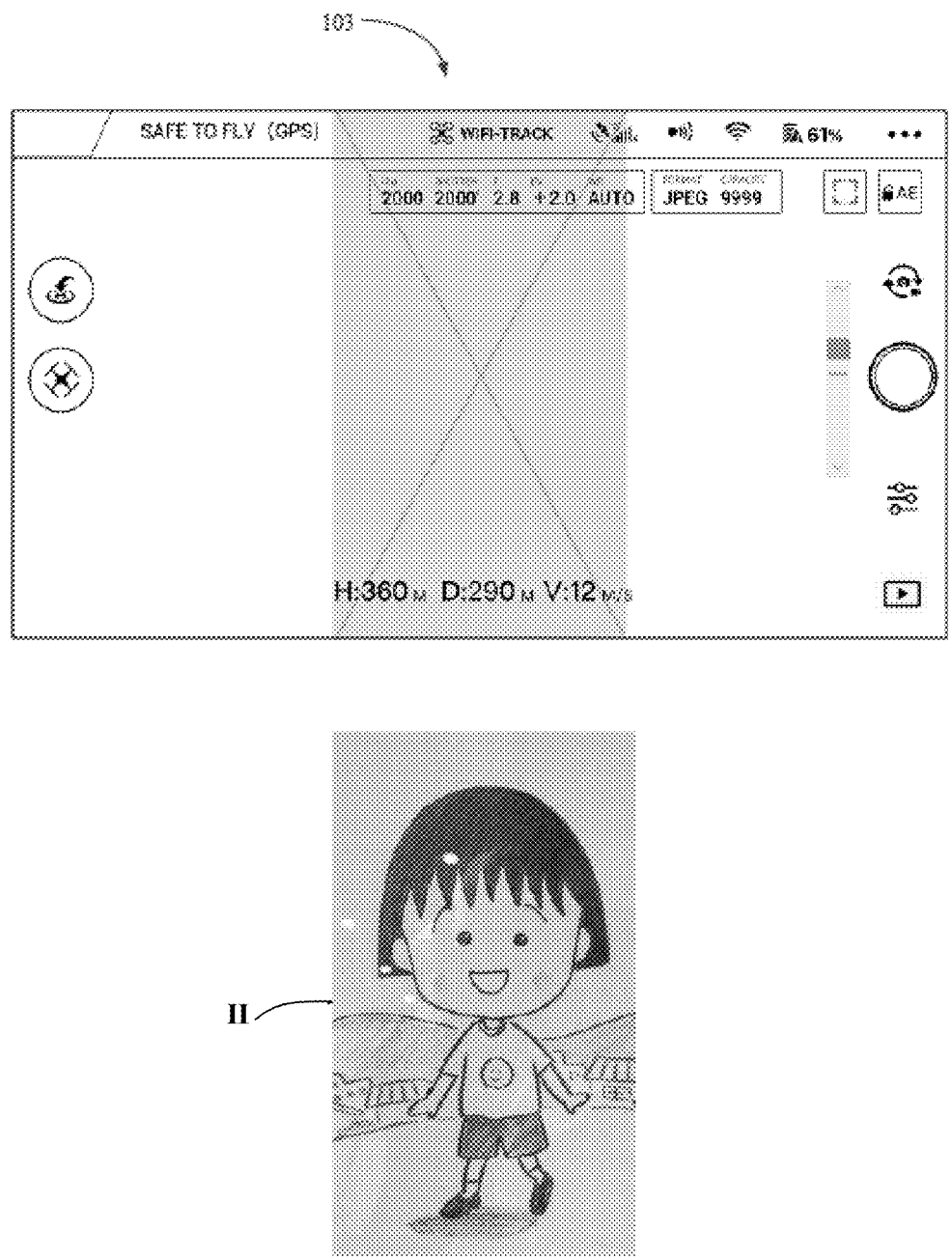

For example, when the display 101 is in the landscape orientation, the display screen 101 displays a control interface 103 in a landscape mode as shown in the upper panel of FIG. 14. In FIG. 14 and FIGS. 16-18, 20-22, 24-26, and 28-30 described below, the cross in the control interface 103 indicates the region of the control interface 103 that is occupied by an image. The camera can be in the landscape shot-mode and output a landscape image I, which includes two upright persons and a scene. The landscape image I is displayed upright in a full-screen mode in the control interface 103. That is, both of the two persons and the scene are displayed upright in the control interface 103, as shown in the lower panel of FIG. 14. If the communication circuit 102 is controlled to send the switching signal for controlling the camera to rotate around the optical axis, so as to change the camera from the landscape shot-mode to the portrait shot-mode, the camera can then output a portrait image II as shown in FIG. 15. Compared with the landscape image I, the portrait image II includes only one person and part of the scene. In conventional technologies, the portrait image II is displayed sideways in a full-screen mode in the control interface 103 as shown in the lower panel of FIG. 16. In contrast, consistent with embodiments of the disclosure, the display screen 101 can display the portrait image II upright in the control interface 103, as shown in the lower panel of FIG. 17.

Figure 18:
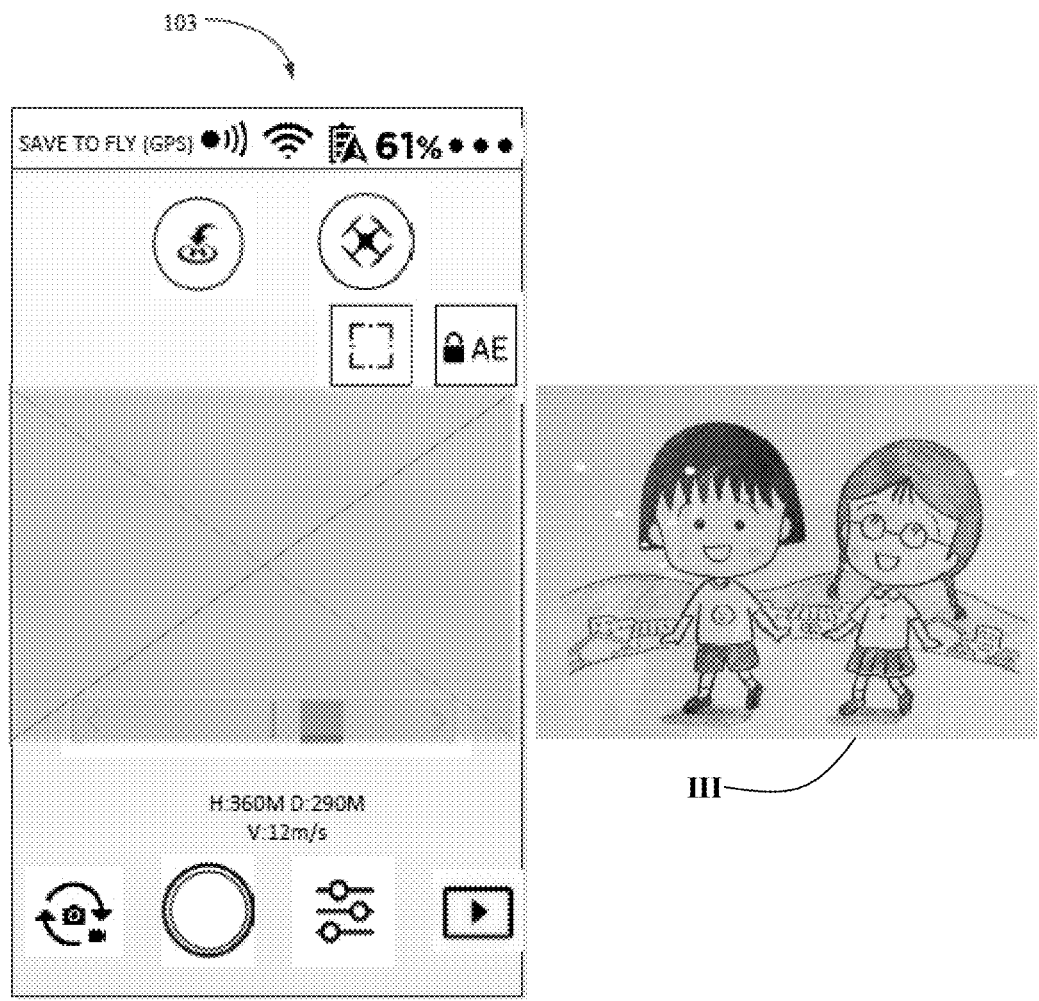
FIGS. 18-21 are schematic diagrams showing a screen in portrait orientation switching from displaying a landscape image to displaying a portrait image according to various exemplary embodiments of the disclosure.
Figure 19:
Figure 20:
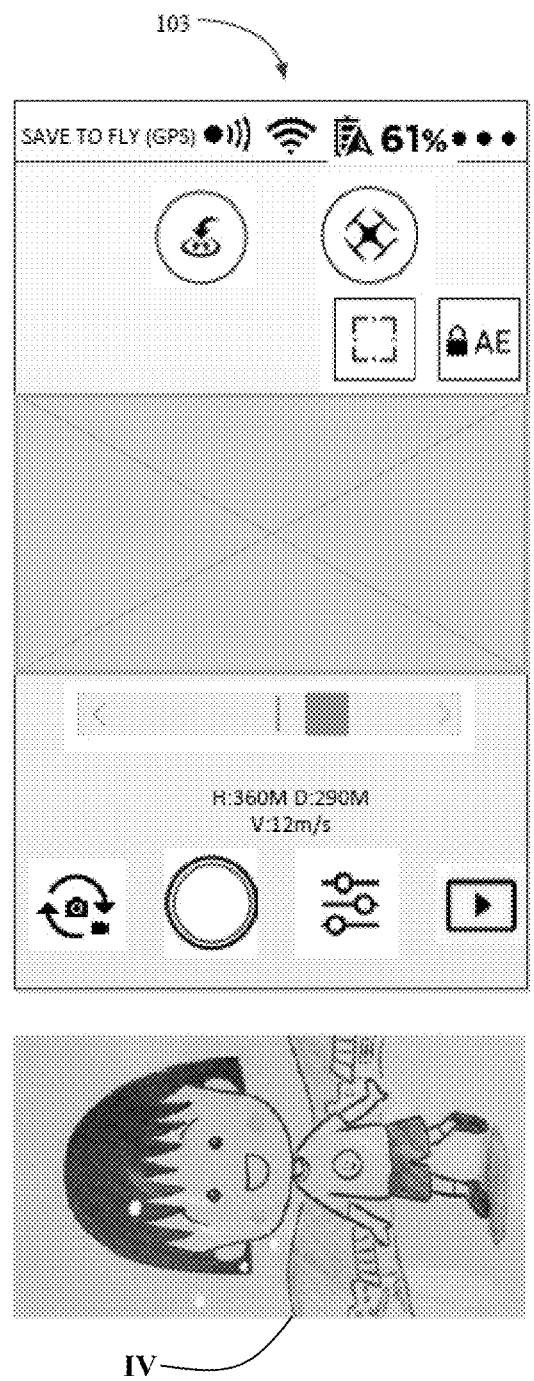
Figure 21:
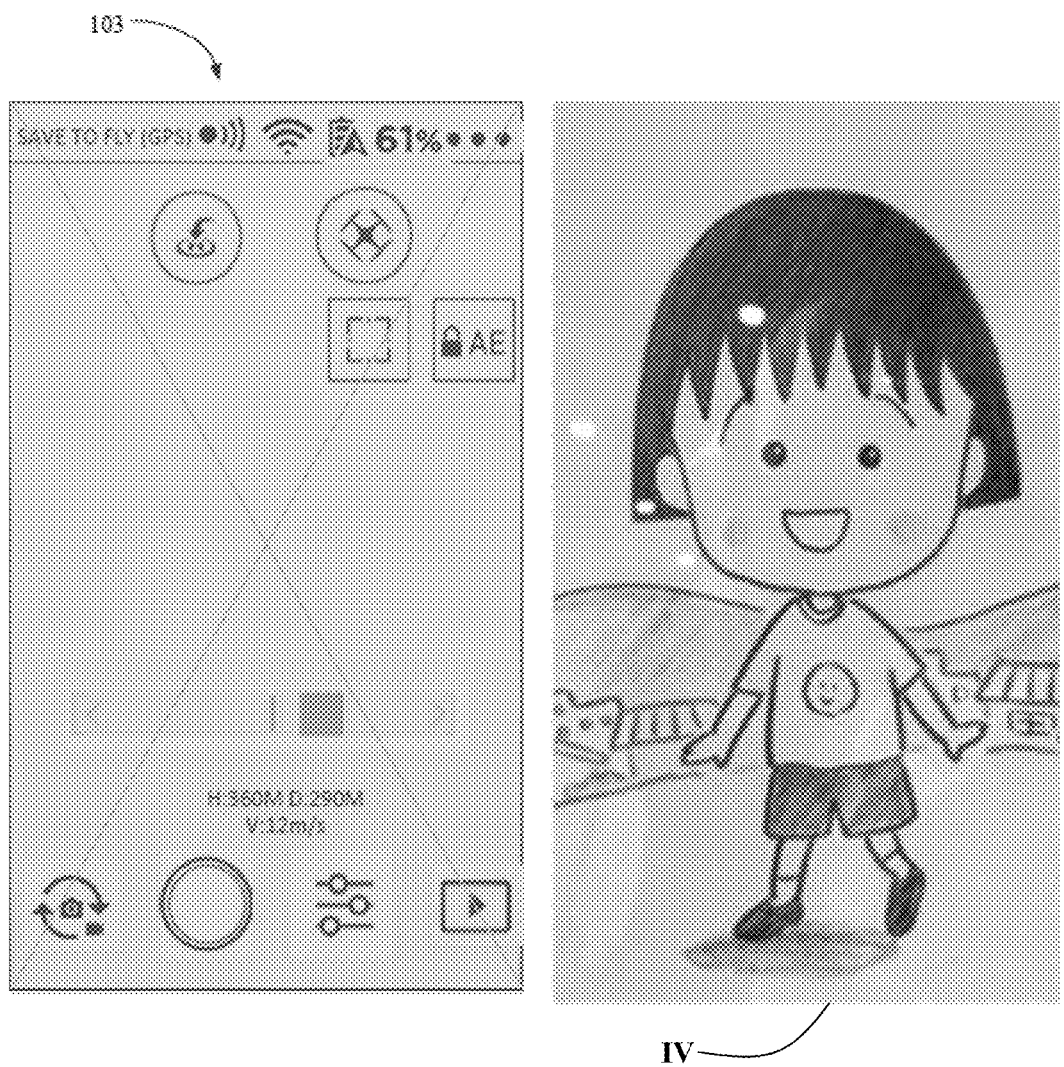

For another example, when the display 101 is in the portrait orientation, the display screen 101 displays the control interface 103 in a portrait mode, as shown in the left panel of FIG. 18. The camera can be in the landscape shot-mode and output a landscape image III, which includes two upright persons and a scene. The landscape image III is displayed upright in the control interface 103. That is, both of the two persons and the scene are upright in the control interface 103 as shown in the right panel of FIG. 18. If the communication circuit 102 is controlled to send the switching signal for controlling the camera to rotate around the optical axis, so as to change the camera from the landscape shot-mode to the portrait shot-mode. The camera can output a portrait image IV as shown in FIG. 19. Compared with the landscape image III, the portrait image IV includes only one person and part of the scene. In the conventional technologies, the portrait image IV is displayed sideways in the control interface 103, as shown in the bottom panel of FIG. 20. In contrast, consistent with embodiments of the disclosure, the display screen 101 can display the portrait image IV upright in the control interface 103 as shown in the right panel of FIG. 21.

Figure 22:
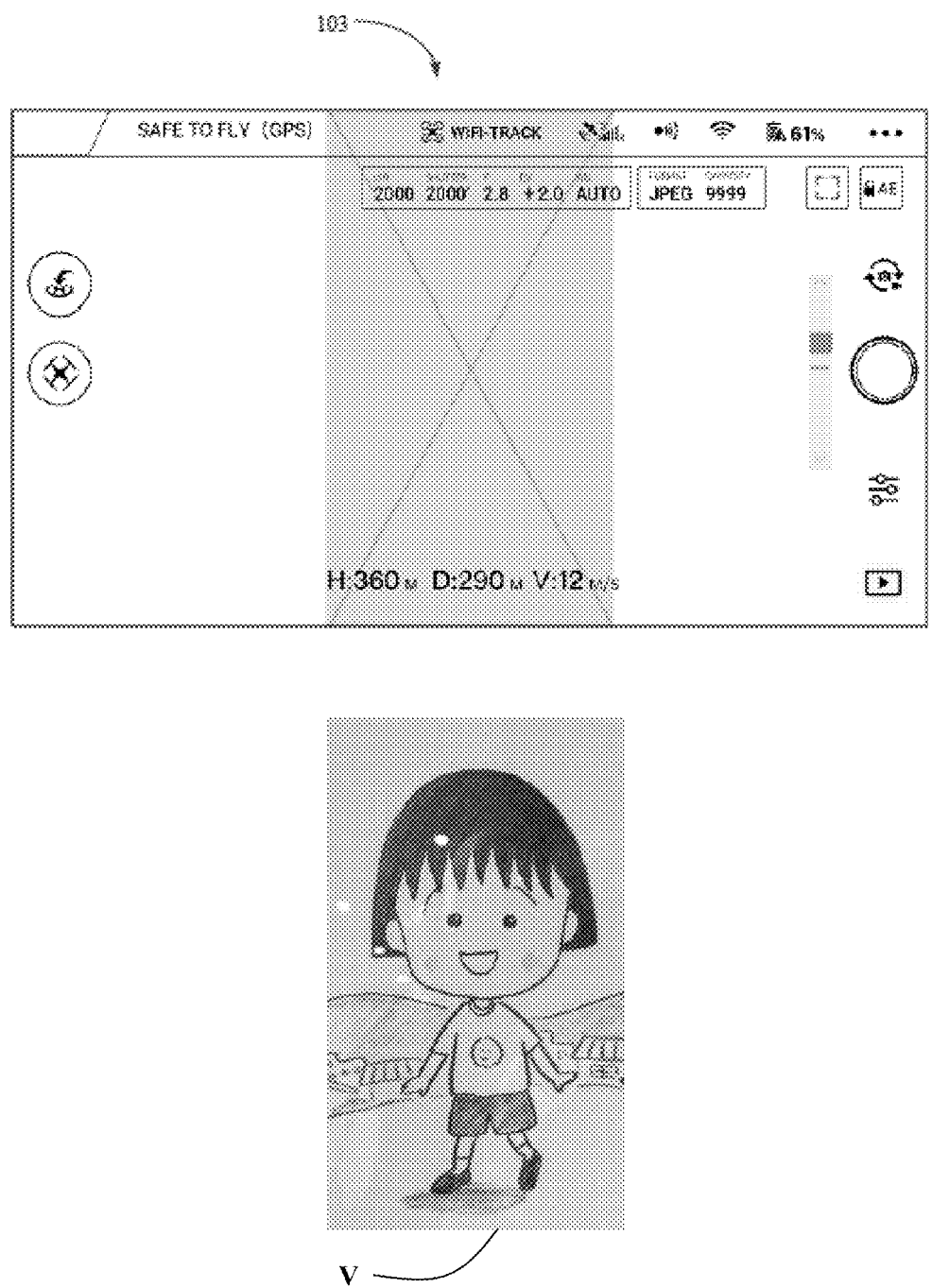
FIGS. 22-25 are schematic diagrams showing a screen in landscape orientation switching from displaying a portrait image to displaying a landscape image according to various exemplary embodiments of the disclosure.
Figure 23:
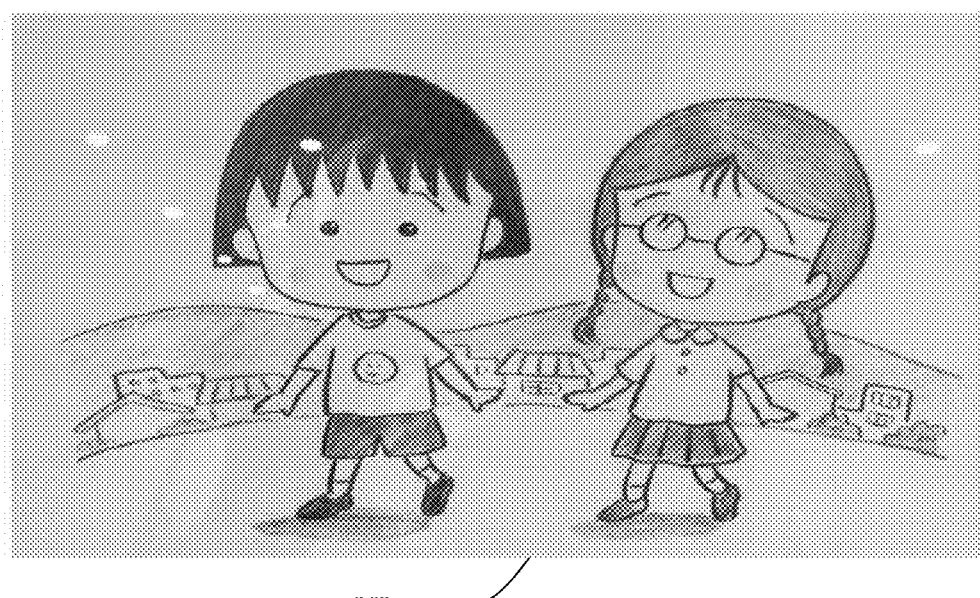
Figure 24:
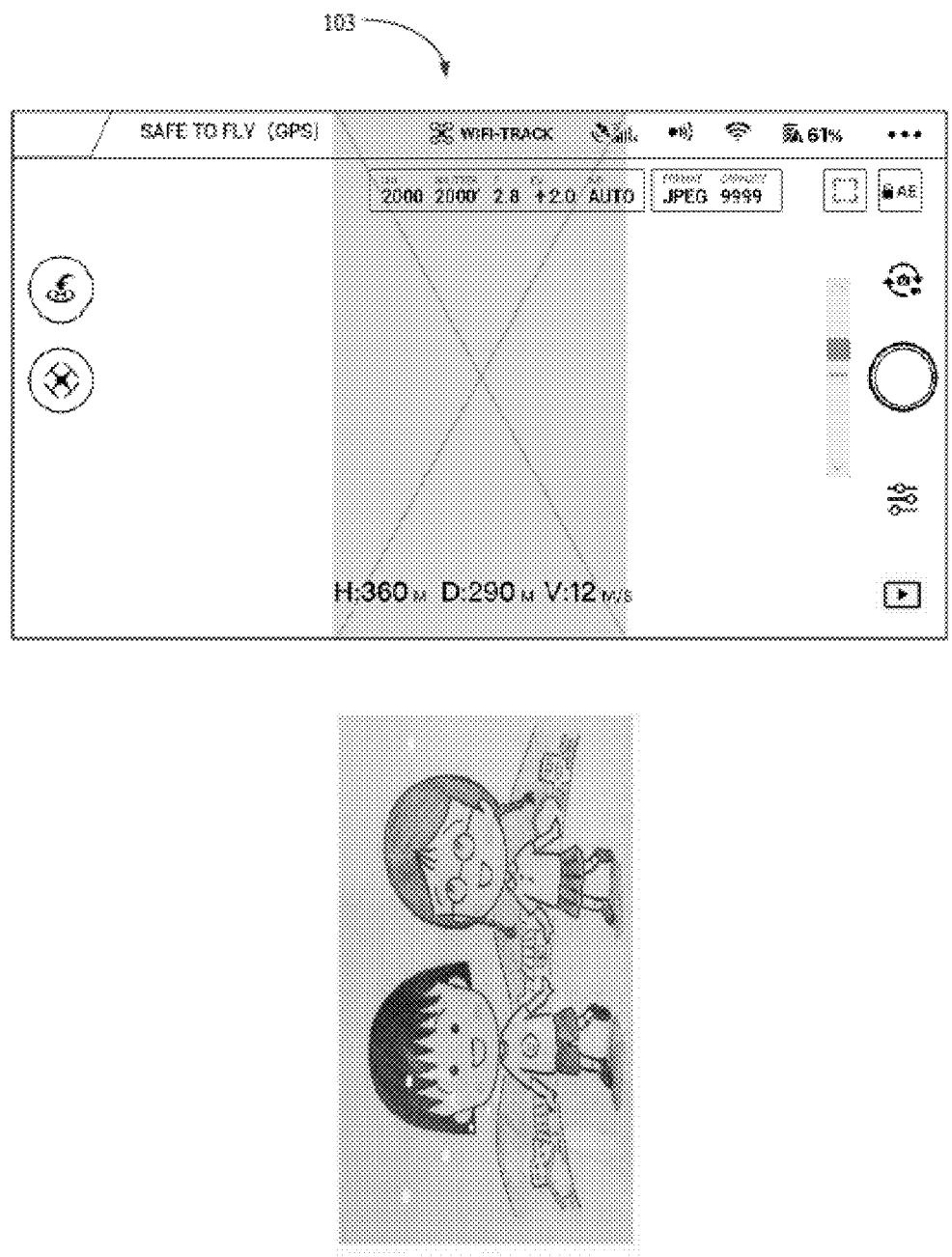
Figure 25:
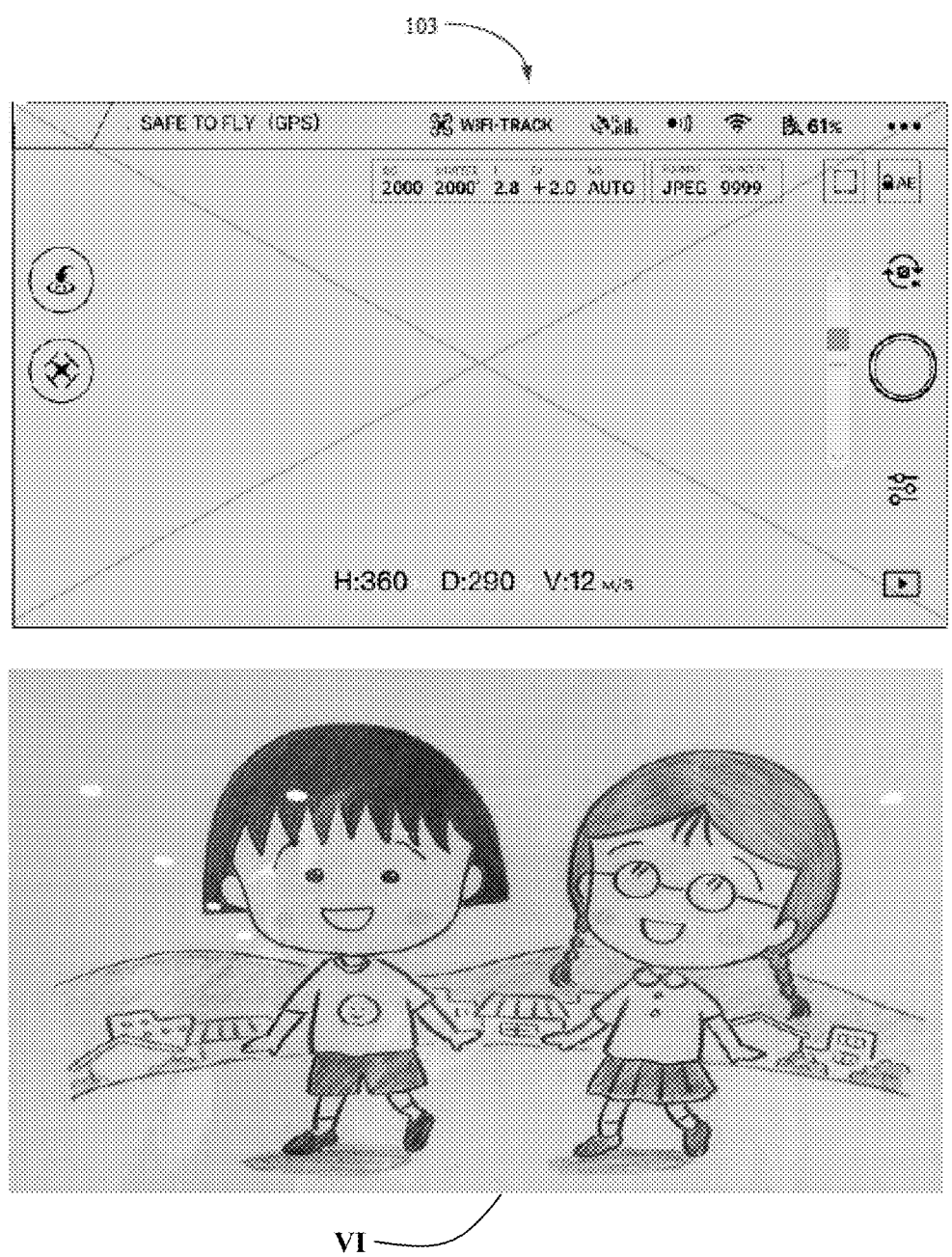

For another example, when the display 101 is in the landscape orientation, the display screen 101 displays the control interface 103 in the landscape mode, as shown in the top panel of FIG. 22. The camera can be in the portrait shot-mode and output a portrait image V, which includes an upright person and a scene. The portrait image V is displayed upright in the landscape control interface 103-1. That is, both the person and the scene are upright the control interface 103 as shown in the bottom panel of FIG. 22. If the communication circuit 102 is controlled to send the switching signal for controlling the camera to rotate around the optical axis, so as to change the camera from the portrait shot-mode to the landscape shot-mode, the camera can output a landscape image VI as shown in FIG. 23. Compared with the portrait image V, the landscape image VI includes two persons and more scene. In the conventional technologies, the landscape image VI is displayed sideways in the control interface 103, as shown in the bottom panel of FIG. 24. In contrast, consistent with embodiments of the disclosure, the display screen 101 can display the landscape image VI upright in the control interface 103, as shown in the bottom panel of FIG. 25.

Figure 26:
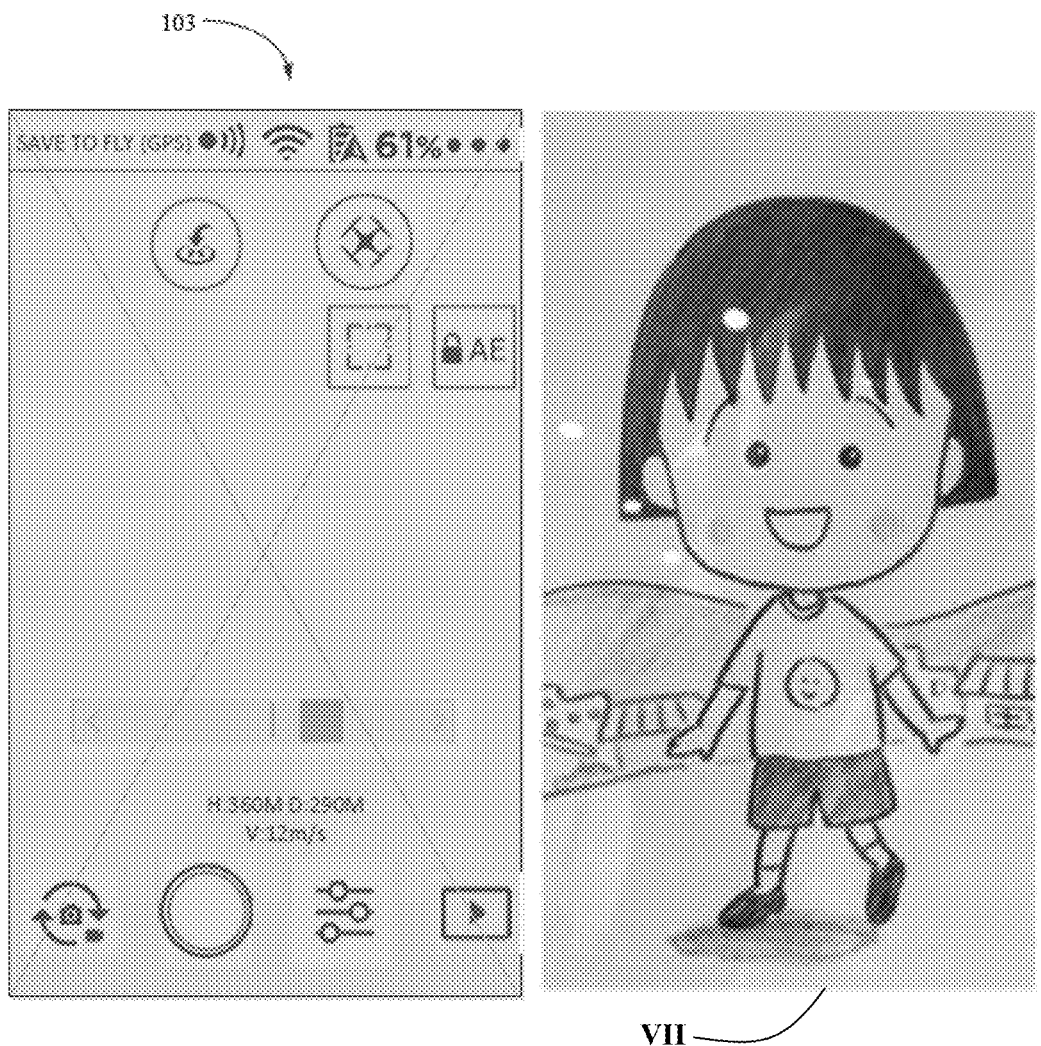
FIGS. 26-29 are schematic diagrams showing a screen in portrait orientation switching from displaying a portrait image to displaying a landscape image according to various exemplary embodiments of the disclosure.
Figure 27:
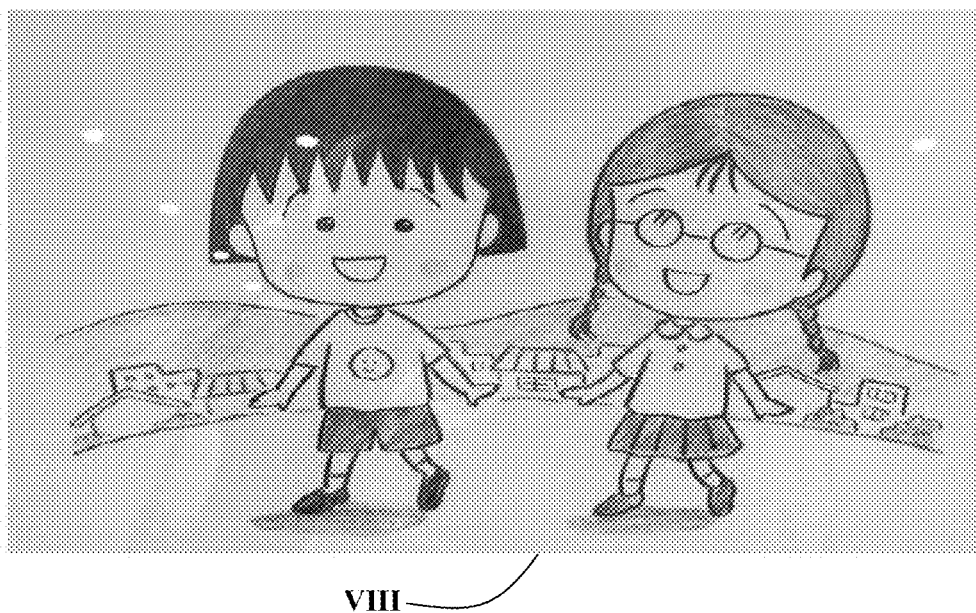
Figure 28:
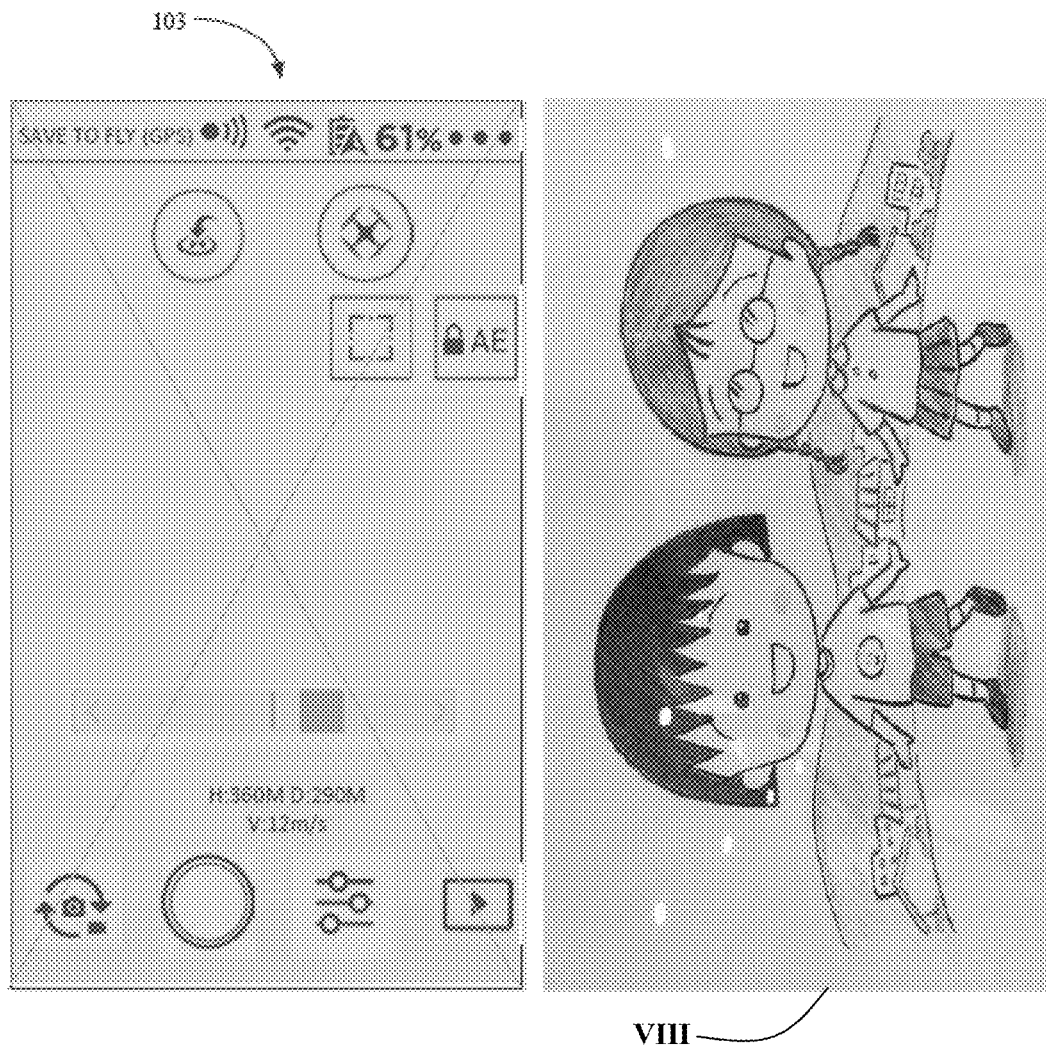
Figure 29:
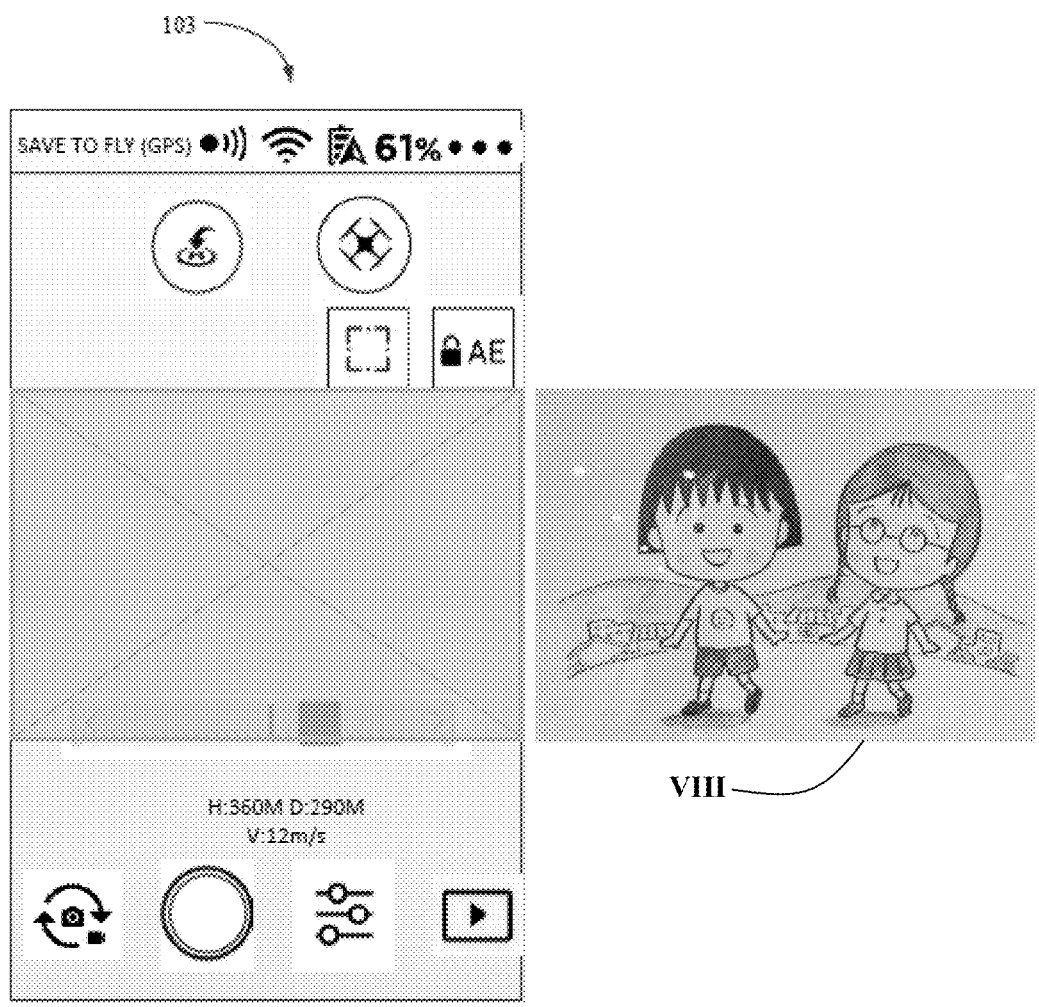

For another example, when the display 101 is in the portrait orientation, the display screen 101 displays the control interface 103 in the portrait mode, as shown in the left panel of FIG. 26. The camera can be in the portrait shot-mode and output a portrait image VII, which includes an upright person and a scene. The portrait image VII is displayed upright in the control interface 103. That is, both the person and the scene are upright in the control interface 103 as shown in the right panel of FIG. 26. If the communication circuit 102 is controlled to send the switching signal for controlling the camera to rotate around the optical axis, so as to change the camera from the portrait shot-mode to the landscape shot-mode, the camera can output a landscape image VIII as shown in FIG. 27. Compared with the portrait image VII, the landscape image VIII includes two persons and more scene. In the conventional technologies, the landscape image VIII is displayed sideways in the control interface 103 as shown in the right panel of FIG. 28. In contrast, consistent with embodiments of the disclosure, the display screen 101 can display the landscape image VIII upright in the control interface 103 as shown in the right panel of FIG. 29.

According to the disclosure, the control method, control apparatus 110, and electronic apparatus 100 can control the display screen 101 to display both the landscape image and the portrait image upright. As such, the image outputted by the camera can be prevented from being displayed sideways in the control interface of the display screen 101 due to the rotation of the camera. Therefore, user-friendly composition can be provided and the user experience can be improved.

Figure 4:
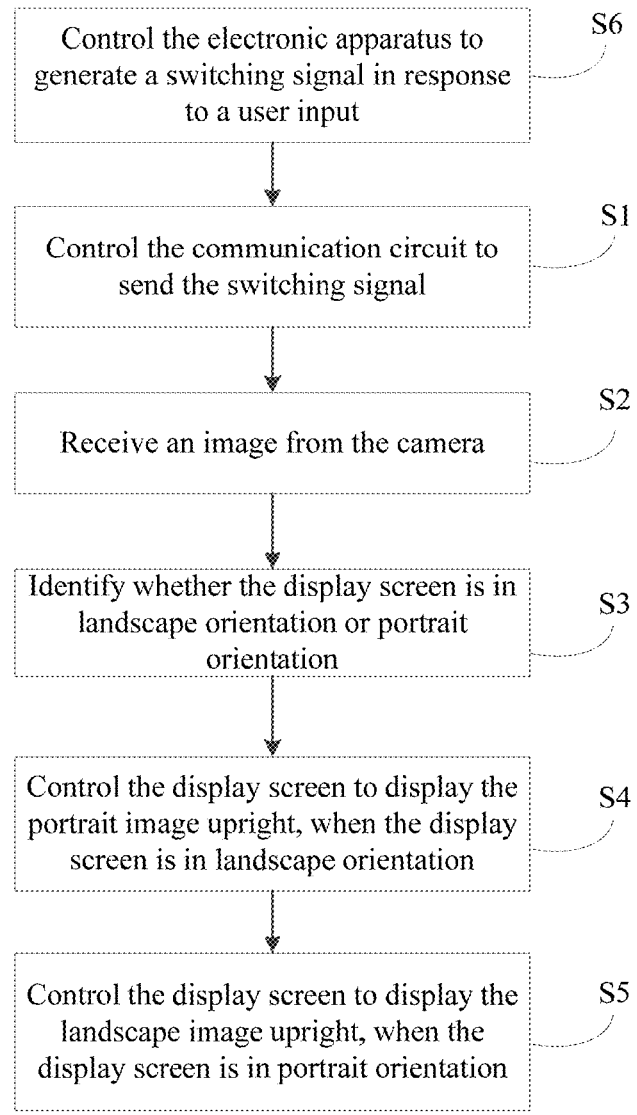
FIG. 4 is a schematic flow chart of a control method according to some other exemplary embodiments of the disclosure.

FIG. 4 is a schematic flow chart of another control method consistent with the disclosure. The processes at S1 to S5 shown in FIG. 4 are similar to the processes at S1 to S5 shown in FIG. 1. Further, as shown in FIG. 4, at S6, the electronic apparatus 100 is controlled to generate a switching signal in response to a user input.

Figure 5:
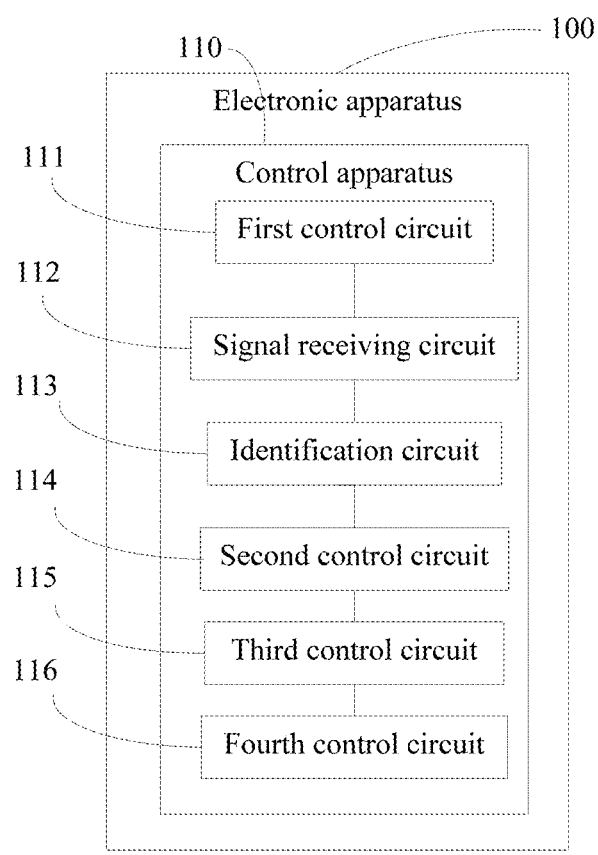
FIG. 5 is a schematic block diagram of an electronic apparatus and a control apparatus according to some other exemplary embodiments of the disclosure.

FIG. 5 is another schematic block diagram of the control apparatus 110 according to some other embodiments of the disclosure. As shown in FIG. 5, the control apparatus 110 further includes a fourth control circuit 116, which is configured to implement the process at S6. That is, the fourth control circuit 116 is configured to control the electronic apparatus 100 to generate the switching signal in response to the user input.

Figure 6:
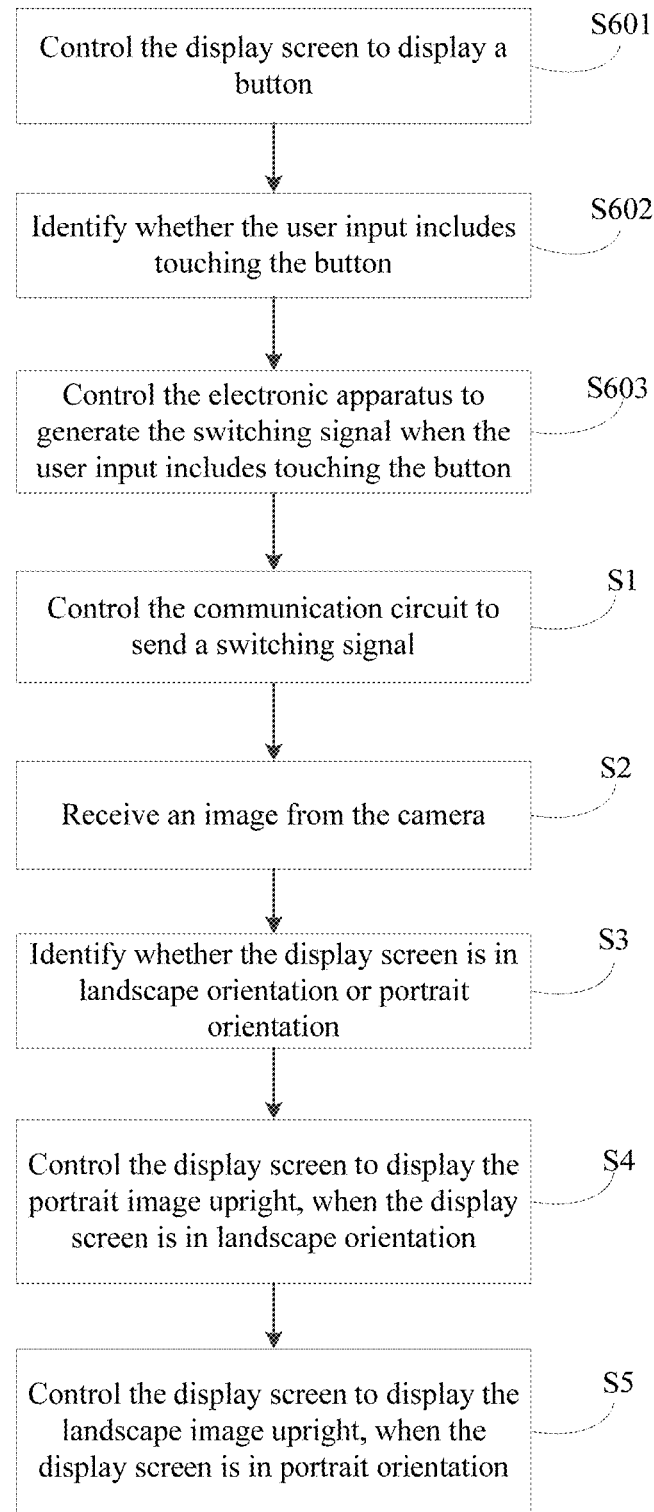
FIG. 6 is a schematic flow chart of a control method according to some other exemplary embodiments of the disclosure.

In some embodiments, the display screen 101 includes a touch screen. FIG. 6 is a schematic flow chart of a control method according to some other embodiments of the disclosure. The processes at S1 to S5 shown in FIG. 6 are similar to the processes at S1 to S5 shown in FIG. 4. As shown in FIG. 6, controlling the electronic apparatus 100 to generate the switching signal in response to the user input (S6 in FIG. 4) can be achieved through the following processes.

Figure 30:
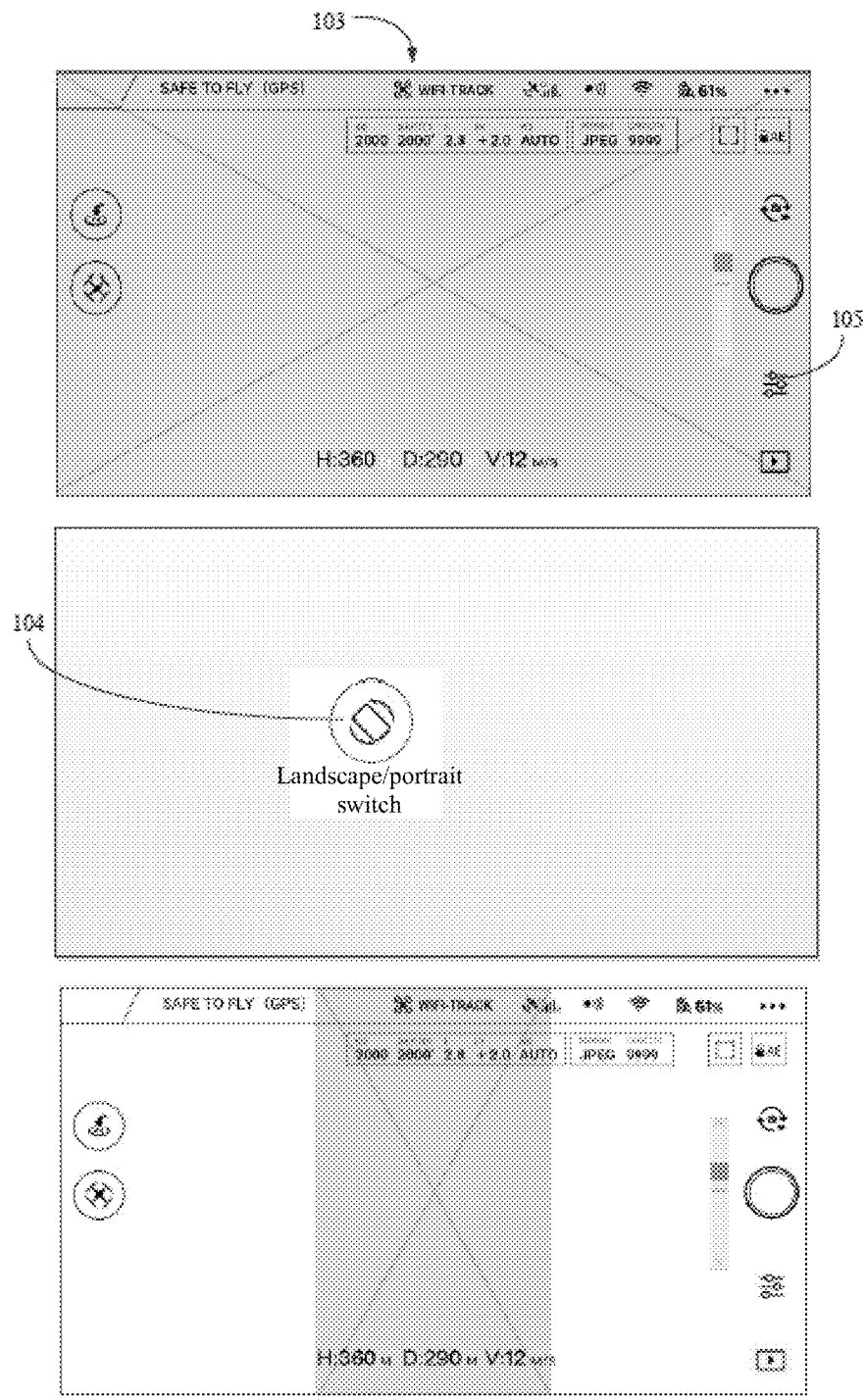
FIG. 30 is a schematic diagram illustrating an electronic apparatus being controlled to generate a switch signal in response to a user input according to various exemplary embodiments of the disclosure.

At S601, the display screen 101 is controlled to display a button 104, as shown in FIG. 30.

At S602, whether the user input includes touching the button 104 is identified.

At S603, when the user input includes touching the button 104, the electronic apparatus 100 is controlled to generate the switching signal.

Figure 7:
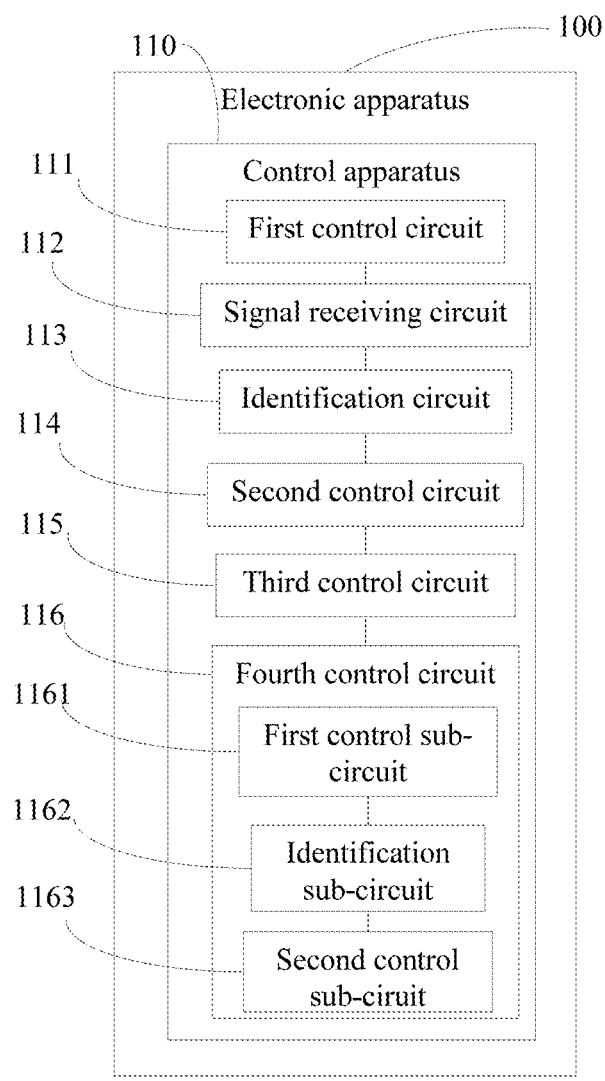
FIG. 7 is a schematic block diagram of an electronic apparatus and a control apparatus according to some other exemplary embodiments of the disclosure.

FIG. 7 is a schematic block diagram of the control apparatus 110 according to some other embodiments of the disclosure. As shown in FIG. 7, the fourth control circuit 116 of the control apparatus 110 includes a first control sub-circuit 1161, an identification sub-circuit 1162, and a second control sub-circuit 1163, which are configured to implement the processes at S601, S602, and S603, respectively. Specifically, the first control sub-circuit 1161 is configured to control the display screen 101 to display the button 104. The identification sub-circuit 1162 is configured to identify whether the user input includes touching the button 104. The second control sub-circuit 1163 is configured to control the electronic apparatus 100 to generate the switching signal, when the user input includes touching the button 104.

For example, as shown in FIG. 30, the control interface 103 can enter a graphic display mode shown in the middle panel of FIG. 30 by click, left-slide, right-slide, or another operation performed on the control interface 103, and display the button 104 for switching between the landscape and portrait shot-modes. When the user clicks the button 104, the switching signal can be generated.

Figure 8:
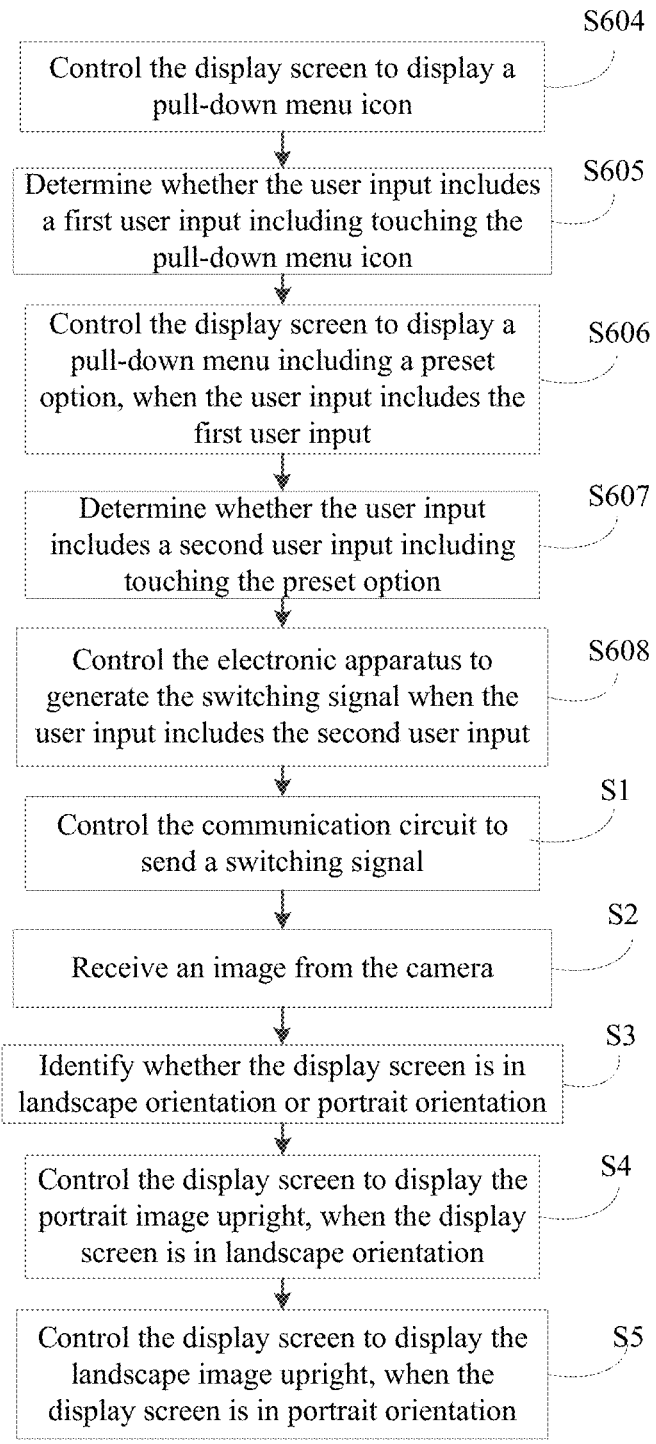
FIG. 8 is a schematic flow chart of a control method according to some other exemplary embodiments of the disclosure.

FIG. 8 is a schematic flow chart of another control method consistent with the disclosure. The processes at S1 to S5 shown in FIG. 8 are similar to the processes at S1 to S5 shown in FIG. 4. As shown in FIG. 8, controlling the electronic apparatus 100 to generate the switching signal in response to the user input (S6 in FIG. 4) can be achieved through the following processes.

At S604, the display screen 101 is controlled to display a pull-down menu icon 105, as shown in FIG. 30.

At S605, whether the user input includes a first user input is determined. The first user input includes touching the pull-down menu icon 105.

At S606, the display screen 101 is controlled to display a pull-down menu, when the user input includes the first user input. The pull-down menu includes a preset option.

At S607, whether the user input includes a second user input is determined. The second user input includes touching the preset option.

At S608, the electronic apparatus 100 is controlled to generate the switching signal, when the user input includes the second user input.

Figure 9:
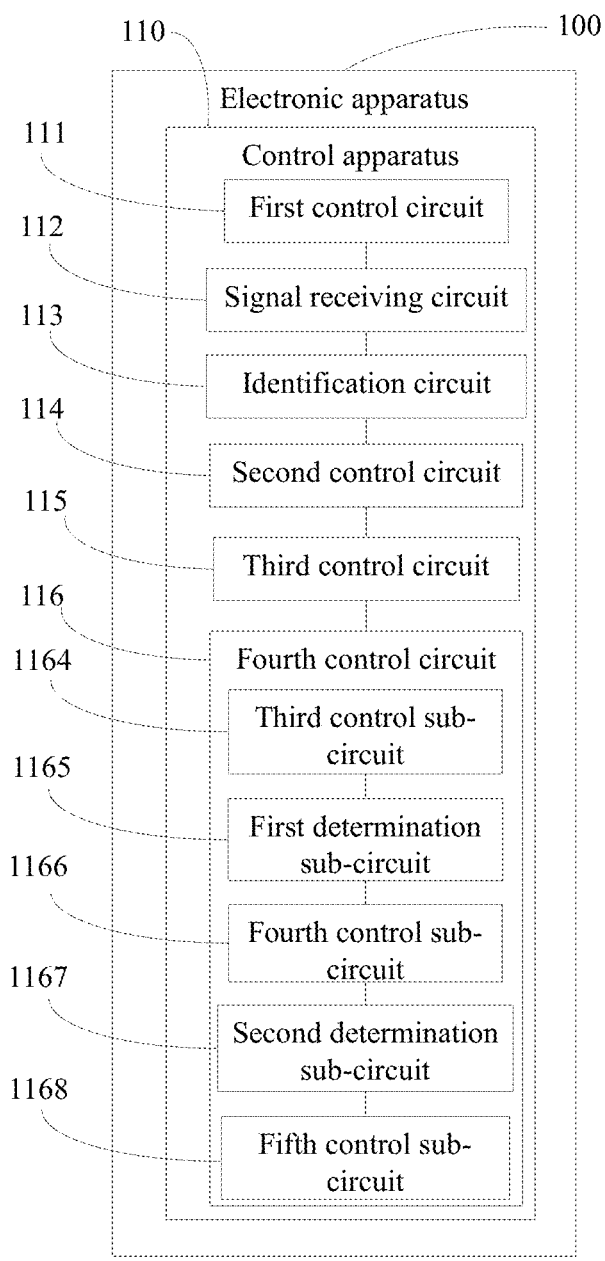
FIG. 9 is a schematic block diagram of an electronic apparatus and a control apparatus according to some other exemplary embodiments of the disclosure.

FIG. 9 is a schematic block diagram of the control apparatus 110 according to some other embodiments of the disclosure. As shown in FIG. 9, the fourth control circuit 116 of the control apparatus 110 includes a third control sub-circuit 1164, a first determination sub-circuit 1165, a fourth control sub-circuit 1166, a second determination sub-circuit 1167, and a fifth control sub-circuit 1168, which are configured to implement the processes at S604, S605, S606, S607, and S608, respectively. Specifically, the third control sub-circuit 1164 is configured to control the display screen 101 to display the pull-down menu icon 105. The first determination sub-circuit 1165 is configured to determine whether the user input includes the first user input, which includes touching the pull-down menu icon 105. The fourth control sub-circuit 1166 is configured to control the display screen 101 to display the pull-down menu, when the user input includes the first user input. The pull-down menu includes the preset option. The second determination sub-circuit 1167 is configured to determine whether the user input includes the second user input, which includes touching the preset option. The fifth control sub-circuit 1168 is configured to control the electronic apparatus 100 to generate the switching signal when the user input includes the second user input.

Figure 10:
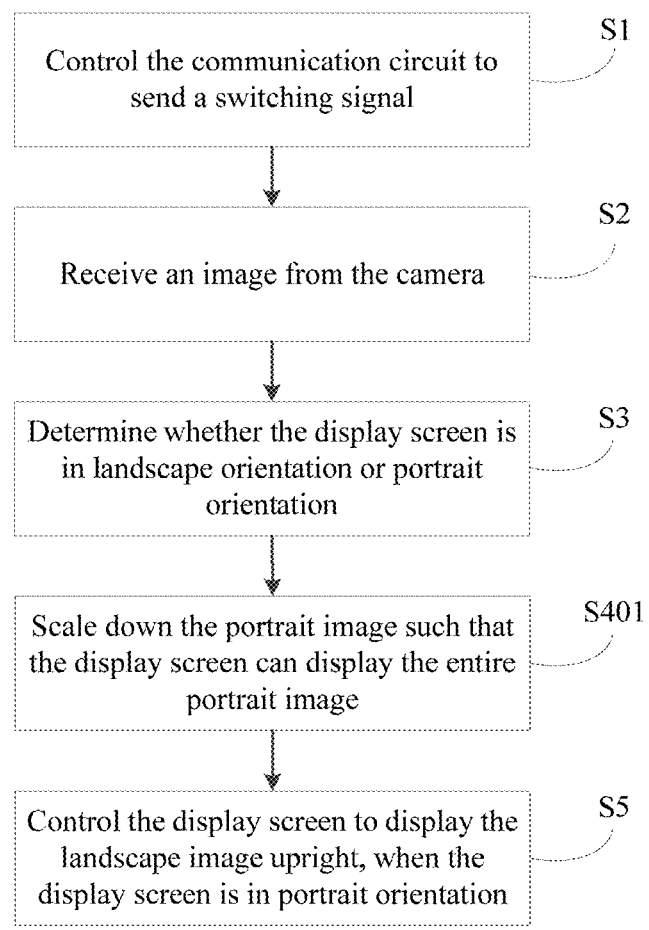
FIG. 10 is a schematic flow chart of a control method according to some other exemplary embodiments of the disclosure.

FIG. 10 is a schematic flow chart of another control method consistent with the disclosure. As shown in FIG. 10, controlling the display screen 101 to display the portrait image upright when the display screen 101 is in the landscape orientation (S4 in FIG. 1) can be achieved through the following process.

At S401, the portrait image is scaled down such that the display screen 101 can display the entire portrait image. That is, the size of the portrait image can be reduced.

Figure 11:
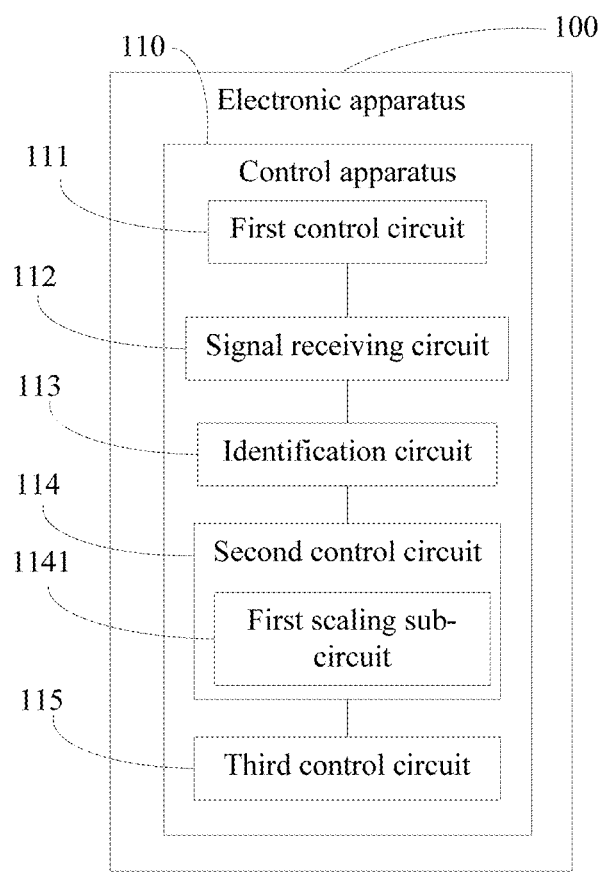
FIG. 11 is a schematic block diagram of an electronic apparatus and a control apparatus according to some other exemplary embodiments of the disclosure.

FIG. 11 is a schematic block diagram of the control apparatus 110 according to some other embodiments of the disclosure. As shown in FIG. 11, the second control circuit 114 of the control apparatus 110 includes a first scaling sub-circuit 1141 to implement the process at S401. That is, the first scaling sub-circuit 1141 can be configured to scale down the portrait image such that the display screen 101 can display the entire portrait image.

In some embodiments, the portrait image is scaled down such that the display screen 101 can display the entire portrait image in the middle of the display screen 101.

In some embodiments, a portrait image to be displayed when the display screen 101 is in the portrait orientation can be scaled down such that the display screen 101 in the portrait orientation can display the entire portrait image. Correspondingly, the control apparatus 110 can include a scaling circuit configured to scale down the portrait image when the display screen 101 is in the portrait orientation. In some embodiments, the portrait image can be scaled down such that the display screen 101 can display the portrait image in the middle of the display screen 101.

Figure 12:
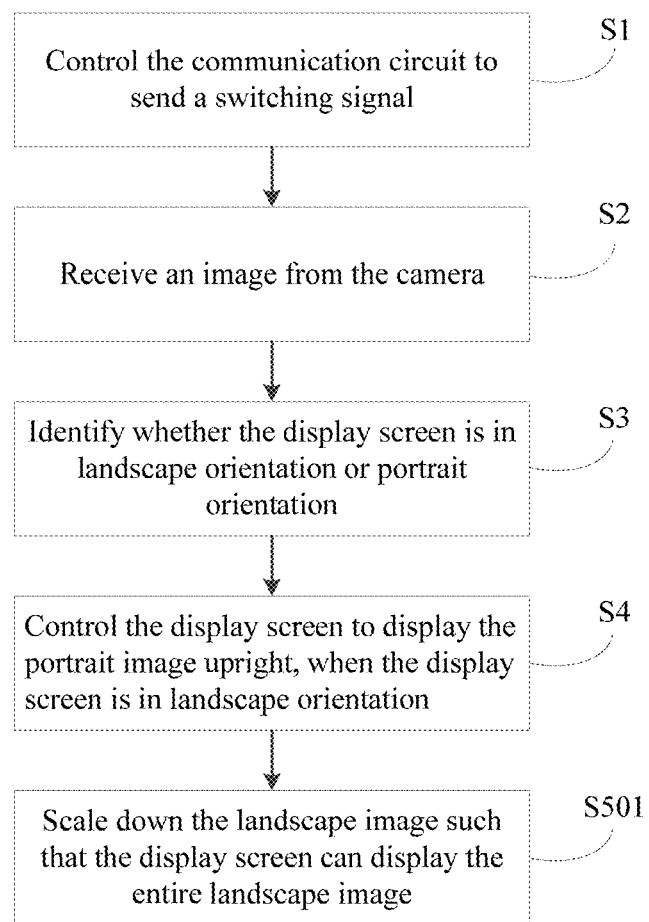
FIG. 12 is a schematic flow chart of a control method according to some other exemplary embodiments of the disclosure.

FIG. 12 is a schematic flow chart of another control method consistent with the disclosure. As shown in FIG. 12, controlling the display screen 101 to display the landscape image upright, when the display screen 101 is in the portrait orientation (S5 in FIG. 1) can be achieved through the following process.

At S501, the landscape image is scaled down such that the display screen 101 can display the entire landscape image.

Figure 13:
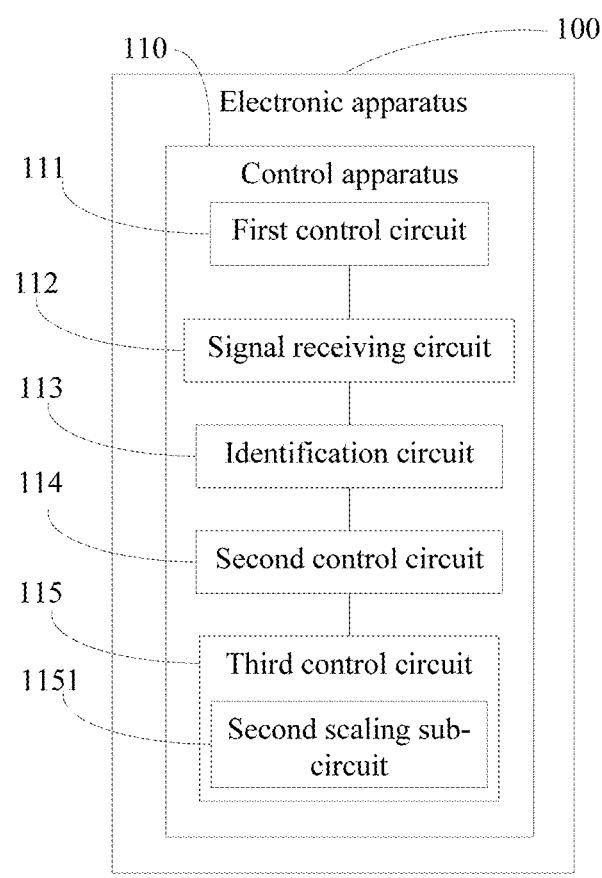
FIG. 13 is a schematic block diagram of an electronic apparatus and a control apparatus according to some other exemplary embodiments of the disclosure.

FIG. 13 is a schematic block diagram of the control apparatus 110 according to some other embodiments of the disclosure. As shown in FIG. 13, the third control circuit 115 of the control apparatus 110 includes a second scaling sub-circuit 1151 to implement the process at S501. That is, the second scaling sub-circuit 1151 is configured to scale down the landscape image such that the display screen 101 can display the entire landscape image.

In some embodiments, the landscape image is scaled down such that the display screen 101 can display the entire landscape image in the middle of the display screen 101.

Figure 31:
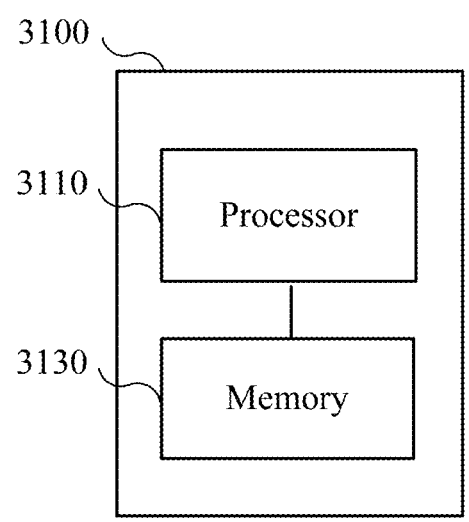
FIG. 31 is a schematic diagram of a control system according to various exemplary embodiments of the disclosure.

FIG. 31 is a schematic diagram of a control system 3100 consistent with the disclosure. As shown in FIG. 31, the control system 3100 include a processor 3110 and a memory 3130.

In some embodiments, the control system 3100 may also include components typically included in a common computer system, such as input and output devices, communication interfaces, and the like. The present disclosure is not limited thereto.

The memory 3130 is configured to store computer executable instructions.

The memory 3130 may be any type of memory, and may include, for example, a Random Access Memory (RAM), a non-volatile memory, and/or a disk memory. The present disclosure is not limited thereto.

The processor 3110 is coupled to the memory 3130 and is configured to execute the computer executable instructions stored in the memory 3130 to implement a control method consistent with the disclosure, such as one of the above-described exemplary methods.

The processor 3110 may include a microprocessor, a Field-Programmable Gate Array (FPGA), a Central Processing Unit (CPU), a Graphics Processing Unit (GPU), or the like. The present disclosure is not limited thereto.

The terms "one embodiment," "some embodiments," "an exemplary embodiment," "for example," "as a specific example," "some examples," or the like in the specification of the disclosure mean that the specific features, structures, materials, or characteristics described with reference to the embodiments or examples are included in at least one of the embodiments or examples of the disclosure. The use of the above terms in the specification of the disclosure may not refer to the same embodiment or example of the disclosure. In addition, the specific features, structures, materials, or characteristics described may be combined in any suitable manner in any one or more of embodiments or examples of the disclosure.

It is appreciated that any process or method described in the flowcharts or in other manners may be a module, section, or portion of program codes includes one or more of executable instructions for implementing a specific logical function or process. The disclosed methods may be implemented in other manners not described here. For example, the functions may not be performed in the order shown or discussed in the specification of the disclosure. That is, the functions may be performed basically in the same way or the reverse order according to the functions involved.

The logics and/or processes described in the flowcharts or in other manners may be, for example, an order list of the executable instructions for implementing logical functions, which may be implemented in any computer-readable storage medium and used by an instruction execution system, apparatus, or device, such as a computer-based system, a system including a processor, or another system that can fetch and execute instructions from an instruction execution system, apparatus, or device, or used in a combination of the instruction execution system, apparatus, or device. The computer-readable storage medium may be any apparatus that can contain, store, communicate, propagate, or transmit the program for using by or in a combination of the instruction execution system, apparatus, or device. The computer readable medium may include, for example, an electrical assembly having one or more wires, e.g., electronic apparatus, a portable computer disk cartridge. e.g., magnetic disk, a random access memory (RAM), a read only memory (ROM), an erasable programmable read only memory (EPROM or flash memory), an optical fiber device, or a compact disc read only memory (CDROM). In addition, the computer readable medium may be a paper or another suitable medium upon which the program can be printed. The program may be obtained electronically, for example, by optically scanning the paper or another medium, and editing, interpreting, or others processes, and then stored in a computer memory.

Those of ordinary skill in the art will appreciate that the exemplary elements and steps described above can be implemented in electronic hardware, computer software, firmware, or a combination thereof. Multiple processes or methods may be implemented in a software or firmware stored in the memory and executed by a suitable instruction execution system. When being implemented in an electronic hardware, the exemplary elements and processes described above may be implemented using any one or a combination of: discrete logic circuits having logic gate circuits for implementing logic functions on data signals, specific integrated circuits having suitable combinational logic gate circuits, programmable gate arrays (PGA), field programmable gate arrays (FPGAs), and the like.

Those of ordinary skill in the art will appreciate that the entire or part of a method described above may be implemented by relevant hardware instructed by a program. The program may be stored in a computer-readable storage medium. When being executed, the program includes one of the processes of the method or a combination thereof.

In addition, the functional units in the various embodiments of the present disclosure may be integrated in one processing unit, or each unit may be an individual physically unit, or two or more units may be integrated in one unit. The integrated unit described above may be implemented in electronic hardware or computer software. The integrated unit may be stored in a computer readable medium, which can be sold or used as a standalone product. The storage medium described above may be a read only memory, a magnetic disk, an optical disk, or the like.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A control method comprising:
in response to a switching signal sent to a camera configured to switch a shooting mode of the camera:
determining a current shooting mode of the camera as a first mode, the first mode including one of a landscape shot-mode and a portrait shot-mode, and a first image being captured by the camera in the first mode and displayed, through a display screen, based on a display mode of the display screen; and
switching the camera from the first mode to a second mode different from the first mode;
receiving, from the camera based on the second mode, a second image, the second image including a landscape image or a portrait image corresponding to the camera in the second mode;
determining the display mode of the display screen and an image orientation of the second image; and
controlling the display screen to display the second image upright based on the display mode for displaying the first image, including:
in response to determining that the display screen is in a landscape orientation and the second image is the portrait image, controlling the display screen to display the portrait image upright through the display screen of the landscape orientation; and
in response to determining that the display screen is in a portrait orientation and the second image is the landscape image, controlling the display screen to display the landscape image upright through the display screen of the portrait orientation.

2. The method of claim 1, further comprising:
generating the switching signal in response to a user input.

3. The method of claim 2, wherein generating the switching signal in response to the user input includes:
displaying a button;
identifying whether the user input includes touching the button; and
generating the switching signal if the user input includes touching the button.

4. The method of claim 2, wherein generating the switching signal in response to the user input includes:
displaying a pull-down menu icon;
determining whether the user input includes a first user input of touching the pull-down menu icon;
displaying a pull-down menu having a preset option if the user input includes the first user input;
determining whether the user input includes a second user input of touching the preset option; and
generating the switching signal if the user input includes the second user input.

5. The method of claim 1, wherein controlling the display screen to display the portrait image upright includes:

scaling down the portrait image such that the display screen displays the entire portrait image.

6. The method of claim 5, wherein scaling down the portrait image includes:
scaling down the portrait image such that the display screen displays the entire portrait image in a middle of the display screen.

7. The method of claim 1, wherein controlling the display screen to display the landscape image upright includes:
scaling down the landscape image such that the display screen displays the entire landscape image.

8. The method of claim 7, wherein scaling down the landscape image includes:
scaling down the landscape image such that the display screen displays the entire landscape image in a middle of the display screen.

9. A control system comprising:
a memory storing computer executable instructions; and
a processor coupled to the memory and configured to execute the instructions to:
in response to a switching signal sent to a camera configured to switch a shooting mode of the camera:
determine a current shooting mode of the camera as a first mode, the first mode including one of a landscape shot-mode and a portrait shot-mode, and a first image being captured by the camera in the first mode and displayed, through a display screen, based on a display mode of the display screen; and
switch the camera from the first mode to a second mode different from the first mode;
receive, from the camera based on the second mode, a second image, the second image including a landscape image or a portrait image corresponding to the camera in the second mode;
determine the display mode of the display screen and an image orientation of the second image; and
control the display screen to display the second image upright based on the display mode for displaying the first image, including:
in response to determining that the display screen is in a landscape orientation and the second image is the portrait image, controlling the display screen to display the portrait image upright through the display screen of the landscape orientation; and
in response to determining that the display screen is in a portrait orientation and the second image is the landscape image, controlling the display screen to display the landscape image upright through the display screen of the portrait orientation.

10. The system of claim 9, wherein the processor is further configured to execute the instructions to:
generate the switching signal in response to a user input.

11. The system of claim 10, wherein the processor is further configured to execute the instructions to:
display a button;
identify whether the user input includes touching the button; and
generate the switching signal if the user input includes touching the button.

12. The system of claim 10, wherein the processor is further configured to execute the instructions to:
display a pull-down menu icon;
determine whether the user input includes a first user input of touching the pull-down menu icon;
display a pull-down menu having a preset option if the user input includes the first user input;
determine whether the user input includes a second user input of touching the preset option; and
generate the switching signal if the user input includes the second user input.

13. The system of claim 9, wherein the processor is further configured to execute the instructions to:
scale down the portrait image such that the display screen displays the entire portrait image.

14. The system of claim 13, wherein the processor is further configured to execute the instructions to:
scale down the portrait image such that the display screen displays the entire portrait image in a middle of the display screen.

15. The system of claim 9, wherein the processor is further configured to execute the instructions to:
scale down the landscape image such that the display screen displays the entire landscape image.

16. The system of claim 15, wherein the processor is further configured to execute the instructions to:
scale down the landscape image such that the display screen displays the entire landscape image in a middle of the display screen.

17. An electronic device comprising:
the display screen;
a communication circuit configured to communicate with an aerial vehicle including a camera; and
a control system of claim 9.

18. The electronic device of claim 17, wherein the electronic device includes at least one of a remote controller, a smartphone, a tablet computer, a smartwatch, smart glasses, or a smart helmet.

* * * * *